US008399076B2

(12) United States Patent
Watanabe et al.

(10) Patent No.: US 8,399,076 B2
(45) Date of Patent: Mar. 19, 2013

(54) INKJET RECORDING MEDIUM AND INKJET RECORDING METHOD

(75) Inventors: Taichi Watanabe, Tokyo (JP); Yuji Sawa, Tokyo (JP); Kei Takigawa, Tokyo (JP); Naoya Morohoshi, Shizuoka (JP); Kiyofumi Nagai, Tokyo (JP)

(73) Assignees: Nippon Paper Industries Co., Ltd., Tokyo (JP); Ricoh Company, Ltd., Tokyo (JP)

( * ) Notice: Subject to any disclaimer, the term of this patent is extended or adjusted under 35 U.S.C. 154(b) by 259 days.

(21) Appl. No.: 12/740,894

(22) PCT Filed: Oct. 30, 2008

(86) PCT No.: PCT/JP2008/069746
§ 371 (c)(1),
(2), (4) Date: Jul. 22, 2010

(87) PCT Pub. No.: WO2009/057690
PCT Pub. Date: May 7, 2009

(65) Prior Publication Data
US 2010/0277541 A1 Nov. 4, 2010

(30) Foreign Application Priority Data

Oct. 31, 2007 (JP) ................................ 2007-282836

(51) Int. Cl.
*B41J 2/015* (2006.01)
*B41M 5/40* (2006.01)
(52) U.S. Cl. ..................... 428/32.37; 347/21; 347/106
(58) Field of Classification Search .............. 428/32.37; 347/21, 106
See application file for complete search history.

(56) References Cited

U.S. PATENT DOCUMENTS

| 5,397,619 | A | 3/1995 | Kuroyama et al. | |
|---|---|---|---|---|
| 6,150,289 | A * | 11/2000 | Chen et al. ............ | 501/148 |
| 2001/0012556 | A1 * | 8/2001 | Kondo et al. ............ | 428/195 |
| 2003/0227531 | A1 | 12/2003 | Hosoi et al. | |
| 2004/0032473 | A1 * | 2/2004 | Ishimoto et al. ........ | 347/100 |
| 2005/0237372 | A1 | 10/2005 | Kondo et al. | |
| 2006/0050130 | A1 | 3/2006 | Yoshida et al. | |
| 2010/0291323 | A1 | 11/2010 | Wasai et al. | |
| 2010/0310796 | A1 | 12/2010 | Nishiiri | |
| 2011/0111144 | A1 | 5/2011 | Wasai et al. | |

FOREIGN PATENT DOCUMENTS

| EP | 1 690 904 | 8/2006 |
|---|---|---|
| JP | HEI 2-274587 | 11/1990 |
| JP | HEI 04-195795 | 7/1992 |
| JP | H04-250092 | 9/1992 |
| JP | H09-011613 | 1/1997 |
| JP | HEI 09-263039 | 10/1997 |
| JP | 2000-085242 | 3/2000 |
| JP | 2002-088679 | 3/2002 |
| JP | 2002-166645 | 6/2002 |
| JP | 2003-277544 | 10/2003 |
| JP | 2004-082464 | 3/2004 |
| JP | 2004-122707 | 4/2004 |
| JP | 2004-181875 | 7/2004 |
| JP | 2004-209965 | 7/2004 |
| JP | 2004-270104 | 9/2004 |
| JP | 2005-035169 | 2/2005 |
| JP | 2005-262512 | 9/2005 |
| JP | 2005-280147 | 10/2005 |
| JP | 2006-088663 | 4/2006 |
| JP | 2006-110985 | 4/2006 |
| JP | 2006-188554 | 7/2006 |
| JP | 2006-256001 | 9/2006 |
| JP | 2007-090606 | 4/2007 |
| JP | 2007-098678 | 4/2007 |
| JP | 2007-130875 | 5/2007 |
| JP | 2007-136777 | 6/2007 |
| JP | 2007-260999 | 10/2007 |
| JP | 2007-261034 | 10/2007 |
| JP | 2008-238611 | 10/2008 |
| WO | WO2009/044692 | 4/2009 |
| WO | WO2009/057690 | 5/2009 |
| WO | WO2009/119651 | 10/2009 |

OTHER PUBLICATIONS

Extended European Search Report corresponding to European Patent Application No. 08835783.5-1251/2196320 dated Feb. 8, 2011.
Extended European Search Report corresponding to European Patent Application No. 08845991.2-2304/2210742 dated Jul. 5, 2012.
Extended European Search Report corresponding to European Patent Application No. 09724357.0-2304/2261043 dated Jun. 8, 2011.
International Search Report corresponding to International Patent Application No. PCT/JP2008/067610 dated Oct. 21, 2008.
International Search Report corresponding to International Patent Application No. PCT/JP2008/069746 dated Jan. 27, 2009.
International Search Report corresponding to International Patent Application No. PCT/JP2009/055929 dated Apr. 28, 2009.
Japanese Industrial Standard JIS K 7105. "Testing Methods for Optical Properties of Plastics," Japanese Standards Association (34 pages) (1981).

(Continued)

*Primary Examiner* — Gerard Higgins
*Assistant Examiner* — Sathavaram I Reddy
(74) *Attorney, Agent, or Firm* — Jenkins, Wilson, Taylor & Hunt, P.A.

(57) ABSTRACT

An ink jet recording medium having an ink receiving layer containing a binder which containing an acrylonitrile butadiene type copolymer, the butadiene concentration of the copolymer is 50 weight % or more, and an inorganic pigment on one or two sides of a base paper mainly composed of wood pulp, wherein the concentration ratio of the acrylonitrile butadiene type copolymer to 100 parts by weight of the inorganic pigment is from one part by weight to eight parts by weight, while 60 weight % or more of the inorganic pigment is kaolin with particles of 0.4 μm or more and below 4.2 μm which account for 64% or more as the cumulative value of the volumetric basis when measured using a laser diffraction method, and the surface roughness of the ink receiving layer is from 0.6 μm to 1.4 μm when a hard backing is used at a clamp pressure of 1,000 kPa according to JIS P8151.

4 Claims, No Drawings

OTHER PUBLICATIONS

Japanese Industrial Standard JIS P 8151. "Paper and board—Determination of roughness/smoothness (air leak methods)—Print-surf method," Japanese Standards Association (23 pages) (2004).

Japanese Industrial Standard JIS P 8251. "Paper, board and pulps—Determination of residue (ash) on ignition at 525 degrees C," Japanese Standards Association (11 pages) (2003).

Japanese Industrial Standard JIS Z 8741. "Specular glossiness—Methods of measurement," Japanese Standards Association (14 pages) (1997).

Notice of Allowance corresponding to U.S. Appl. No. 12/934,486 dated Aug. 23, 2012.

Notification of Transmittal of Translation of the International Preliminary Report on Patentability (Chapter I or Chapter II of the Patent Cooperation Treaty) corrresponding to International Patent Application No. PCT/JP2008/067610 dated May 14, 2010.

Notification of Transmittal of Translation of the International Preliminary Report on Patentability (Chapter I or Chapter II of the Patent Cooperation Treaty) corresponding to International Patent Application No. PCT/JP2008/069746 dated Jun. 10, 2010.

Notification of Transmittal of Translation of the International Preliminary Report on Patentability (Chapter I or Chapter II of the Patent Cooperation Treaty) corresponding to International Patent Application No. PCT/JP2009/055929 dated Nov. 18, 2010.

Official Action corresponding to U.S. Appl. No. 12/680,677 dated Jan. 18, 2012.

* cited by examiner

INKJET RECORDING MEDIUM AND INKJET RECORDING METHOD

BACKGROUND OF THE INVENTION

1. Field of the Invention

The present invention relates to a glossy ink jet recording medium having the feel of glossy coated paper for use in offset printing and to an ink jet recording method conducted using the ink jet recording medium.

2. Description of the Related Art

The Ink jet recording system makes full color printing easily achievable and is quiet. Therefore, the ink jet recording system is being used in many applications as printing performance rapidly improves. The applications include, for example, document recording using document preparation software, digital image recordings such as digital photographs, copies of scanned silver halide photographs and beautiful printed materials such as books, and image producing for display such as limited edition posters. In recent years, the ink jet recording system has been used frequently in place of the offset printing mode, particularly for the commercial printing industry that is involved in printing small lots of many different productions.

Ink jet recording media with compositions suited for individual applications have been proposed. For example, a non-coated paper type medium is used when only letters are printed directly on the paper surface. A coated paper type medium on which an ink receiving layer has been formed as a coating layer is used when qualities of resolution and color reproducibility rivaling those of silver halide photographs are desired since the ink emitted by a printer needs to be absorbed. When a particularly high gloss is required for coated paper media, casting methods are used to prepare cast paper type media and the like. At the same time, a roll type medium containing a thick coating layer was developed and is being used in posters and display applications.

However, glossy ink jet recording paper that can replace glossy offset printing paper is almost non-existent due to very high production costs. Since the amount of the ink usage increases as color reproducibility of the image is improved in a coated paper type medium, the higher ink absorption capacity in ink receiving layers is desired. Therefore, substances such as synthetic amorphous silica and the like are frequently used in ink receiving layers. The ink absorption improves in these cases, but there are problems that the gloss declines and the texture diverges from those of offset printed materials. Furthermore, a feel is different from that of an offset printed material in the case of a cast paper type medium since the medium is much more glossy in comparison to conventionally coated offset printing paper and the paper is thicker. In addition, the production cost for such ink jet recording media is more expensive than that of conventionally coated offset printing paper since expensive raw materials such as silica, alumina, poly(vinyl alcohol), ethylene vinyl acetate emulsions and ink fixing agents (polyamine type, DADMAC type and polyamidine type agents) are used in large amounts.

When a conventionally coated offset printing paper is printed using an ink jet printer, poor image qualities such as feathering (blurring), bleeding (blurred outlines), uneven printing (poor uniformity) of solid image (poor image density) and cockle (undulation of printed areas) are rose due to the low ink absorption capacity of the coated layer.

Coated paper for gravure printing is one type of printing paper that, among coated printing papers, has relatively high oil absorbance and is slightly better for printing using an ink jet printer than is conventionally coated offset printing paper. However, poor image qualities similar to those described above for conventional offset printing paper appear in a coated gravure printing paper since the paper is calendered using a high nip pressure to achieve gravure printing adaptability which results in a coating layer that contains very few voids, and the ink absorption capacity is inadequate.

Given this situations, a medium composed of a recording layer (coating layer) containing kaolin with an average particle size of from 0.2 μm to 2.0 μm satisfying $1 \leq L/W \leq 50$ [where L is the long diameter of a particle and W represents the short diameter (thickness) of the particle] and a 75° gloss for the recording layer surface according to JIS-Z-8741 of at least 40% is disclosed as an ink jet recording medium with the feel of a coated offset printing paper. (For example, see Patent Reference 1).

In addition, a constitution containing a pigment coated layer (coating layer) having kaolin as the main ingredient and having a designated cobb sizing (degree of water absorption) after the pigment coating layer is impregnated with a cationic resin is disclosed as an offset printing paper with ink jet adaptability. (For example, see Patent Reference 2.)

Furthermore, a recording sheet (see Patent Reference 3) with an ink receiving layer containing columnar, needle-shaped orthorhombic aragonite calcium carbonate as a pigment and containing as a binder an epoxy resin and a styrene butadiene type copolymer resin on the film base support medium is disclosed as an ink jet recording paper containing SBR (styrene butadiene copolymer) in the ink receiving layer binder. A recording medium (Patent Reference 4) containing in the binder component of the ink receiving layer 5 weight % to 55 weight % of styrene butadiene latex of which 20 weight % to 45 weight % is derived from butadiene monomer is also disclosed. A recording paper (Patent Reference 5) containing clay and calcium carbonate with a specific oil absorption amount as the pigment in the ink receiving layer in addition to containing as the binder an acrylamide/diallylamine type polymer and a styrene butadiene type copolymer is disclosed.

[Patent Reference 1] Japanese Patent Application Publication No. 2004-209965

[Patent Reference 2] Japanese Patent Application Publication No. 2004-270104

[Patent Reference 3] Japanese Patent Application Publication No. H04-250092

[Patent Reference 4] Japanese Patent Application Publication No. H09-11613

[Patent Reference 5] Japanese Patent Application Publication No. 2004-82464

PROBLEMS TO BE SOLVED BY THE INVENTION

However, ink absorption is inadequate when an ink jet printer is used to print on the coated paper described in Patent References 1, 2 and 5, and the rubbing resistance of the printed area is poor. Therefore, good print quality sometimes can not be achieved.

In addition, the support medium in the recording paper described in Patent Reference 3 is a film, and the problem is that the feel of the paper is completely different than the feel of the glossy coated paper for offset printing. Furthermore, the recording medium described in Patent Reference 4 contains silica as the pigment in the ink receiving layer, and the problem is again that the feel is completely different than that of the glossy coated paper for offset printing.

Therefore, the object of the present invention are to obtain the feel of coated offset printing paper inexpensively and to present an ink jet recording medium that yields good print quality with excellent ink absorption and excellent rubbing resistance in the printed area.

SUMMARY OF THE INVENTION

The inventors conducted an extensive study of compositions that could yield a feel of coated glossy offset printing paper suitable for ink jet printing. As a result, the inventors discovered that the problems described above could be solved by specifying the type of pigment and binder used in the ink receiving layer, the ratio of the pigment and binder concentrations and also the surface roughness of the ink receiving layer.

The present invention provides an ink jet recording medium having an ink receiving layer containing a binder which containing an acrylonitrile butadiene type copolymer, the butadiene concentration of the copolymer is 50 weight % or more, and an inorganic pigment on one or two sides of a base paper mainly composed of wood pulp, wherein the concentration ratio of the acrylonitrile butadiene type copolymer to 100 parts by weight of the inorganic pigment is from one part by weight to eight parts by weight, while 60 weight % or more of the inorganic pigment is kaolin with particles of 0.4 μm or more and below 4.2 μm which account for 64% or more as the cumulative value of the volumetric basis when measured using a laser diffraction method, and the surface roughness of the ink receiving layer is from 0.6 μm to 1.4 μm when a hard backing is used at a clamp pressure of 1,000 kPa according to JIS P8151.

Preferably, the white paper glossiness of the ink receiving layer surface is from 55% to 80% at a light incidence angle of 75 degrees measured according to JIS Z8741.

A second aspect in accordance with the present invention provides an ink jet recording method using an ink containing at least water, a particulate coloring agent and a wetting agent to record an image on said ink jet recording medium.

According to the present invention, an ink jet recording medium with the feel of a coated glossy offset printing paper can be obtained inexpensively and also excellent ink absorption, excellent rubbing resistance in the printed area, and good printing quality can be obtained.

DESCRIPTION OF THE PREFERRED EMBODIMENTS

The embodiment of the ink jet recording medium according to the present invention is described below.

(Base Paper)

The base paper contained wood pulp as the main ingredient. Chemical pulp (bleached or unbleached softwood kraft pulp, bleached or unbleached hardwood kraft pulp and the like), mechanical pulp (ground pulp, thermo-mechanical pulp, chemical thermo-mechanical pulp and the like), de-inked pulp and the like may be used individually or used mixed in optional proportions as the wood pulp.

The pH of the stock at the time of paper making may be acid, neutral or alkaline. In addition, the presence of filler in the paper is preferred since the opacity of the paper tends to improve with increasing amounts of the filler in the base paper. As the filler, well known fillers such as hydrated silicic acid, white carbon, talc, kaolin, clay, calcium carbonate, titanium oxide, synthetic resin fillers and the like may be used. Furthermore, the base paper may also contain aids such as aluminum sulfate, sizing agents, paper strength additives, yield improving agents, coloring agents, dyes, defoaming agents, pH adjusting agents and the like. Now, the basis weight of the base paper is not particularly restricted.

A base paper may be impregnated or coated with a size press solution prepared using starch, PVA, sizing agent and the like prior to forming an ink receiving layer for the purpose of strengthening and sizing the paper. The method used for the impregnation or coating is not particularly restricted, but the impregnation method typified by a pond type size press or the coating method typified by rod metaling size press, gate roller coater and blade coater is preferred. In addition, the size press solution described above may also contain, in ranges that do not adversely affect the advantages of the present invention, fluorescent dyes, electro conductive agents, water retention agents, water resistance agents, pH adjusting agents, defoaming agents, lubricating agents, preservatives, surface activating agents and the like in optional proportions when necessary.

(Ink Receiving Layer)

1. Pigments in the Ink Receiving Layer

The pigment for the ink receiving contains kaolin with particles of 0.4 μm or more and below 4.2 μm which account for 64% or more as the cumulative value of the volumetric basis when measured using a laser diffraction method. Kaolin is a clay containing at least one kaolin mineral such as kaolinite, halloysite, dickite and nakrite, and any well known kaolin found in conventional coated offset paper may be used. Kaolin produced in Georgia, Brazil, China and the like as well as grade 1, grade 2 and delami grade kaolin are available, but the origin and grades of kaolin are not restricted to those mentioned here. In addition, a kaolin or mixtures of kaolins containing at least two kaolins may be appropriately selected and used as the pigment.

The laser diffraction method used to measure particle size distribution utilizes the light scattering phenomenon, and the results are obtained using the Mie theory and Fraunhoffer approximation. However, the method used to calculate particle size distribution from the scattered light differ according to the particle size measuring device. Therefore, the value obtained by using a laser method particle size measurement device (Malvern Co., Mastersizer type S with a red light source at 633 nm (He—Ne laser) and blue light at 466 nm (LED)) is used for the present invention.

In addition, a homogeneous dispersion prepared by adding a sample slurry containing kaolin dropwise into pure water is used as the sample in the particle size distribution measuring method.

The particle size distribution for the kaolin commonly used in coated offset printing paper extends from about 0.05 μm to about 40 μm. For example, the particle size distribution for KCS (the product name for a kaolin produced by Imerys Corp.) shows that particles of 0.4 μm or more and below 4.2 μm hold 53%, particles below 0.4 μm in particle diameter account for 21%, and particles 4.2 μm or more in particle diameter account for 26% as the cumulative value of the volumetric basis. Based on the results of the extensive study conducted by the inventors, the use of kaolin with a majority (at least 64%) of the particles in the range of from at least 0.4 μm to smaller than 4.2 μm yielded excellent ink absorption in comparison to the commonly available kaolin described above. It is thought that the pigment particles yield lower packing density and form porous, bulky ink receiving layers due to the narrow particle size distribution and a more uniform particle diameter when the particle size distribution is concentrated in the range described above. A porous ink receiving layer has much better ink absorption than an ink receiving layer in which the pigment is packed tightly.

In contrast, when a kaolin with particle size distribution wherein particles from 0.4 μm or more to smaller than 4.2 μm account for under 64% as the cumulative value of the volumetric basis is used in place of the kaolin with the particle size distribution described above, the kaolin is tightly packed in an ink receiving layer due to the broad particle size distribution, and the ink absorption declines.

That is, when a kaolin with particle size distribution wherein particles from 0.4 μm or more to smaller than 4.2 μm account for under 64% as the cumulative value of the volumetric basis, containing many particles with particle diameter smaller than 0.4 μm is used, the ink receiving layer becomes dense and the ink absorption declines.

In addition, when a kaolin with particle size distribution wherein particles from 0.4 μm or more to smaller than 4.2 μm account for under 64% as the cumulative value of the volumetric basis, containing many particles with a particle diameter 4.2 μm or more is used, the number of small pores formed on the coated paper surface is small resulting in fewer ink absorption channels and leading to poor ink absorption. Furthermore, the smoothness of the coated surface obtained using such particles is adversely affected, and a heavy calender treatment must be conducted in order to obtain a desired degree of white paper gloss resulting in smaller gaps in the coating layer and poor ink absorption.

When the sum of the inorganic pigments present in an ink receiving layer is one hundred weight parts, the proportion of the kaolin with the particle size distribution described above must be 60 weight parts or more. When the kaolin proportion is less than 60 weight parts, the advantages described above derived from the kaolin with the particle size distribution described above are difficult to realize. A kaolin proportion of 70 weight parts or more is preferred, and a kaolin concentration ratio of one hundred weight parts (100% of the inorganic pigment present in the ink receiving layer is kaolin) is most preferred.

As far as the inorganic pigment other than kaolin used in an ink receiving layer is concerned, any well known inorganic pigments commonly used in coated offset printing paper may be used. As the inorganic pigment, one or at least two appropriately selected from inorganic pigments such as ground calcium carbonate, precipitated calcium carbonate, silica composite calcium carbonate, talc, sintered kaolin obtained by sintering the kaolin described above, calcium sulfate, barium sulfate, titanium dioxide, zinc oxide, alumina, magnesium carbonate, magnesium oxide, silica, calcium silicate, bentonite, zeolite, sericite, smectite and the like may be used in addition to, for example, a kaolin with particle size distribution different from that described above.

2. Ink Receiving Layer Binder

The binder used in an ink receiving layer contains an acrylonitrile butadiene type copolymer with a butadiene concentration of 50% or more. Here the butadiene concentration refers to the weight % of the butadiene monomer in the total monomer composition used when producing the acrylonitrile butadiene type copolymer described above.

The acrylonitrile butadiene type copolymer used in the present invention is obtained using an aliphatic conjugated diene type monomer and a vinyl type monomer as major components, and a vinyl cyanide compound is mainly used as the vinyl type monomer. However, a water soluble ethylene type monomer and a vinyl type monomer other than the vinyl cyanide compound may also be present. At least one point of the glass transition point of the acrylonitrile butadiene type copolymer needs to be in the range from −100° C. to 50° C., and the copolymer is ordinarily produced as an emulsion with an average particle size of from 50 nm to 150 nm.

As the aliphatic conjugated diene type monomer, 1,3-butadiene, isoprene, chloroprene, 2,3-dimethyl-1,3-butadiene and the like, for example, may be cited. 1,3-butadiene is preferred. These aliphatic conjugated diene type monomers may be used individually or as a mixture of at least two. In addition, as the vinyl cyanide compound, (meth)acrylonitrile, α-chloroacrylonitrile, vinylidene cyanide and the like, for example, may be cited. Acrylonitrile is particularly preferred.

As the water soluble ethylene type monomer, unsaturated carboxylic acid monomers such as (meth)acrylic acid, maleic acid, fumaric acid, itaconic acid and the like; vinyl type monomers containing an amide group such as (meth)acrylamide, N,N-dimethyl (meth)acrylamide, N,N-dimethylaminopropyl (meth)acrylamide, N-methylol (meth)acrylamide and the like; vinyl type monomers containing a hydroxyl group such as 2-hydroxyethyl (meth)acrylate, 2-hydroxypropyl (meth)acrylate, 3-hydroxypropyl (meth)acrylate and the like; vinyl type monomers containing an epoxy group such as glycidyl (meth)acrylate, ally glycidyl ether and the like, for example, may be cited. These water soluble ethylene type monomers may be used individually or in a mixture of at least two.

As the vinyl type monomer other than a vinyl cyanide compound, aromatic vinyl compounds, substituted or unsubstituted alkyl(meth)acrylates, vinyl acetate and the like, for example, may be cited. Of these, as the aromatic vinyl compound, styrene, α-methylstyrene, o-methylstyrene, m-methylstyrene, p-methylstyrene, o-chlorostyrene, m-chlorostyrene, p-chlorostyrene and the like, for example, may be cited. Styrene is particularly preferred. In addition, as alkyl (meth) acrylates, methyl (meth)acrylate, ethyl (meth)acrylate, n-propyl (meth)acrylate, i-propyl (meth)acrylate, n-butyl (meth) acrylate, i-butyl (meth)acrylate, sec-butyl (meth)acrylate, t-butyl (meth)acrylate, n-hexyl (meth)acrylate, 2-ethylhexyl (meth)acrylate, n-octyl (meth)acrylate, cyclohexyl (meth) acrylate, lauryl (meth)acrylate, stearyl (meth)acrylate, benzyl (meth)acrylate, isobornyl (meth)acrylate, 2-cyanoethyl (meth)acrylate, and the like, for example, may be cited. Methyl methacrylate is particularly preferred. These vinyl type monomers other than vinyl cyanide compounds may be used individually or in a mixture of at least two.

When the average particle size of the acrylonitrile butadiene type copolymer used in the present invention is smaller than 50 nm, the fluidity, gloss realization and the like decline in the paper coating colour prepared using the copolymer. In contrast, when the average particle size exceeds 150 nm, the high speed fluidity tends to decline in the paper coating composition prepared using the copolymer. The average particle size of the acrylonitrile butadiene type copolymer can be controlled by adjusting the amounts of water, emulsifier, polymerization initiator and the like used during the polymerization.

In addition, when the glass transition temperature of the acrylonitrile butadiene type copolymer used in the present invention is lower than −100° C., the adhesion strength increases but the tackiness is poor (too tacky). The concern is that roller contamination and the like are encountered when manufacturing coated paper. In contrast, when the glass transition temperature is higher than 50° C., the tackiness is excellent (low tackiness) but the concern is inadequate adhesion strength. A glass transition temperature lower than 0° C. is particularly preferred from the standpoint of improved rubbing resistance of the printed area. The glass transition temperature of an acrylonitrile butadiene type copolymer can be controlled by the monomer composition during the production process.

The greater the butadiene concentration in an acrylonitrile butadiene type copolymer, the better the flexibility and elongation in the copolymer obtained. Therefore, a high butadiene concentration is preferred from the standpoint of impact resistance and adhesion strength. However, tackiness worsens when the butadiene concentration is too high, and roller contamination during a coated paper manufacturing process becomes a concern. For this reason, the preferred butadiene concentration in the acrylonitrile butadiene type copolymer is from 50 weight % to 60 weight %.

In addition, the acrylonitrile concentration in an acrylonitrile butadiene type copolymer is not particularly restricted. However, the greater the acrylonitrile concentration the better the tackiness prevention in the copolymer obtained. Therefore, a greater acrylonitrile concentration is preferred from the standpoint of operations during coated paper manufacturing. However, an acrylonitrile concentration that is too high leads to a rigid copolymer and poor adhesion strength. For this reason, the acrylonitrile concentration in the acrylonitrile butadiene type copolymer is preferably from 20% to 40%.

When the sum total of the inorganic pigments present in an ink receiving layer is one hundred weight parts, the proportion of the acrylonitrile butadiene type copolymer described above needs to be one weight part or more and eight weight parts or less, and from at least two weight parts to six weight parts or less is preferred. The acrylonitrile butadiene type copolymer in an ink receiving layer functions as a binder, and the gaps in the ink receiving layer increase as the polymer proportion decreases, and the ink absorption improves. However, when the proportion of the acrylonitrile butadiene type copolymer is below one weight part, the ink absorption is good but the ink receiving layer lacks strength and paper dust is generated when cutting. In contrast, when the proportion of the acrylonitrile butadiene type copolymer exceeds eight weight parts, the gaps present in the ink receiving layer are filled with the acrylonitrile butadiene type copolymer resulting in decreased ink absorption capacity and making obtaining good print quality difficult.

In the present invention, other polymeric compounds in addition to the acrylonitrile butadiene type copolymer described above may be used as a binder. As the polymeric compound, one or at least two compounds may be appropriately selected and used from among starches such as oxidized starch, etherified starch, esterified starch and the like, poly(vinyl alcohol) and modified materials thereof, casein, gelatin, carboxymethyl cellulose, polyurethane, vinyl acetate, unsaturated polyester resins and the like. The presence of these polymeric compounds at less than 30 weight % of the binder as a whole is preferred. When the proportion of the acrylonitrile butadiene type copolymer in the binder is less than 70 weight %, the ink receiving layer tends to have poor strength, paper dust tends to form during cutting and the rubbing resistance of printed areas tends to decline.

When starch is added as the binder, the rigidity of the coating layer improves, and the pore construction in the coating layer resists rupture even when a calender treatment is conducted. In this case, the surface roughness of the ink receiving layer increases to the range described below, and good ink absorption results.

When multiple types of polymeric compounds are used as binders in an ink receiving layer in addition to the acrylonitrile butadiene type copolymer, the proportion of the binder as a whole per one hundred weight parts of the inorganic pigment is preferably eight weight parts or less in order to maintain the gaps in the ink receiving layer.

Paper dust formation during cutting can be reduced in the present invention by using, as the main component in an inorganic pigment, kaolin with particles of 0.4 µm or more and below 4.2 µm which account for 64% or more as the cumulative value of the volumetric basis when measured using a laser diffraction method, and also by the presence of the acrylonitrile butadiene type copolymer described above in the binder. In addition, the rubbing resistance of printed areas when printed using ink jet printers improves. The reasons for these are not clearly understood, but the paper dust reduction is attributed to the acrylonitrile butadiene type copolymer imparting flexibility and elongation to the coating layer, and the improvement in the rubbing resistance of printed areas is attributed to the appropriate tackiness of the coating layer that allows the ink coloring materials to bond well.

(Other Ingredients)

Appropriate additional aids such as organic pigments such as plastic pigments and the like, pigment dispersing agents, printability improving agents, thickeners, water retention agents, lubricants, defoaming agents, foaming suppression agents, mold releasing agents, foaming agents, coloring dyes, coloring pigments, fluorescent dyes, preservatives, water resistance agents, surface activating agents, pH adjusting agents and the like may be added to an ink receiving layer as needed Now, the proportion of the organic pigment is preferably twenty weight parts or less when the sum total of the inorganic pigments present in an ink receiving layer is one hundred weight parts.

(Surface Roughness)

The surface roughness of the ink receiving layer needs to be 0.6 µm or more and 1.4 µm or less when using a hard backing and a clamp pressure of 1,000 kPa according to JIS P8151 [Paper and board—Determination of roughness/smoothness (air leak methods)—Print-surf method]. Here, JIS P8151 defines a measuring method of the surface roughness using a Print-surf tester.

The greater the surface roughness of an ink receiving layer, the better the ink absorption. However, an ink receiving layer with a surface that is less rough better approximates the feel of glossy coated paper for offset printing. Due to the considerations, the surface roughness of an ink receiving layer is regulated in the range described above.

When the surface roughness of an ink receiving layer is less than 0.6 µm, the feel of a glossy coated paper for offset printing is obtained. However, a heavy calendering treatment is required to smooth the surface which results in a reduction in the gaps in the ink receiving layer. Furthermore, the paper surface contact area for ink solution droplets decreases, and the ink absorption declines. In contrast, when the surface roughness of an ink receiving layer exceeds 1.4 µm, the ink absorption is good, but the gloss declines, yielding a surface that feels grainy to the touch. Thus the feel and texture of a glossy coated paper for offset printing cannot be obtained. Even more, an ink receiving layer surface roughness of 0.7 µm or more and 1.3 µm or less is preferred.

The surface roughness can be adjusted after an ink receiving layer is formed by using a calendering device such as machine calender, super calender, soft calender, shoe calender and the like, and by appropriately selecting the conditions such as treatment temperature, treatment speed, treatment nip pressure, number of treatment steps, roller diameter, material of roller and the like.

(Air Resistance)

The air resistance of the ink jet recording medium of the present invention is not particularly restricted, but 2200 seconds per surface or less is preferred with 2000 seconds or less particularly preferred. The lower the air resistance, the faster the ink penetration leading to good ink absorption. When the air resistance exceeds 2200 seconds, the ink penetration is slow and ink absorption is poor, resulting in a trend for solid image areas to be unevenly printed. The air resistance can be adjusted by changing the calendering conditions, the binder amount in the ink receiving layer, the coating amount of the ink receiving layer and the basis weight of the base paper. For example, calender pressure may be increased, calender treatment speed may be slowed, or the calender roll hardness may be raised, and the value of the degree of air permeation resistance increases. In addition, the binder concentration in the ink receiving layer may be increased, the coating amount of the ink receiving layer may be increased, or the basis weight of the base paper may be increased, and the value of the degree of air permeation resistance increases.

(Coating Amount)

The coating amount of an ink receiving layer is not particularly limited, but from 2 g/m$^2$ to 40 g/m$^2$ per one side is preferred and from 5 g/m$^2$ to 30 g/m$^2$ is particularly preferred. The greater the coating amount, the greater the gap amount in the ink receiving layer and the better the ink absorption. When the coating amount of an ink receiving layer per one side is below 2 g/m$^2$, the base paper substrate cannot be adequately covered. That is, the coated paper surface feels uneven and has the feel of uncoated paper, the white paper gloss does not improve and the feel of glossy coated paper for offset printing tends to be difficult to realize. In addition, when the coating amount per one side is below 2 g/m$^2$, the absorption capacity of the ink receiving layer declines and printing defects such as feathering and bleeding tend to occur. In contrast, when the coating amount of the ink receiving layer exceeds 40 g/m$^2$, drying of the coating becomes a burden, workability tend to decline and the manufacturing cost tends to rise.

(Coating Method)

As the method used to form an ink receiving layer on a base paper, commonly used coating devices such as blade coaters, roller coaters, air knife coaters, bar coaters, gate roller coaters, curtain coaters, gravure coaters, flexo gravure coaters, spray coaters, size presses and the like may be used for on machine and off machine processes. In addition, the ink receiving layer may be formed on one side or two sides, and one layer or at least two layers may also be formed.

(White Paper Glossiness)

The white paper glossiness measured at a light angle of incidence of 75 degrees for an ink receiving layer surface according to JIS Z8741 is preferably 55% or more and 80% or less. In order to improve the ink absorption, a lower white paper glossiness is better. In contrast, a higher white paper gloss helps achieve the feel of a glossy coated paper for offset printing. Therefore, the white paper glossiness is specified in the range described above.

When the white paper glossiness of an ink receiving layer surface is less than 55%, the feel of a glossy coated paper for offset printing tends to not be realized. In contrast, when the white paper glossiness exceeds 80%, the gaps in the ink receiving layer decrease and ink absorption tends to decline. A white paper glossiness for an ink receiving layer surface of from 60% to 75% is even more preferred.

The white paper glossiness can be adjusted after an ink receiving layer is formed using calendering devices such as machine calenders, super calenders, soft calenders, shoe calenders and the like and conducting a surface treatment by selecting appropriate conditions such as treatment temperature, treatment speed, treatment nip pressure, treatment steps, roller diameter, material of roller and the like. As the calendering treatment becomes intensive, higher white paper gloss is likely to be obtained and surface roughness values decrease.

The ink jet recording medium of the present invention can be utilized not only as a recording paper for an ink jet recording system as described above but also as a recording paper for a digital photographic system, as an offset printing paper and as a gravure printing paper.

<Ink>

The ink used on the ink jet recording medium of the present invention contains at least water, particulate coloring agents and a wetting agent, and those that also contain penetration agents, surface activating agents and other components as needed may be cited.

The ink has a surface tension of from 20 mN/m to 35 mN/m at 25° C., and from 23 mN/m to 34 mN/m is even better. When the surface tension is less than 20 mN/m, extensive blurring occurs on the recording medium of the present invention and a stable ink discharge cannot be realized. When the surface tension exceeds 35 mN/m, the ink does not penetrate sufficiently into the recording medium, beading sometimes occurs and the risk of long drying times exists.

Here, the surface tension can be measured, for example, using a surface tension measuring device (Kyowa Interface Science Co., Ltd., CBVP-Z) with a platinum plate at 25° C.

(Coloring Agent)

As the particulate coloring agent, the use of fine coloring particles (coloring pigments) is preferred. The particulate coloring agent is dispersed in a liquid component composed mainly of water and a wetting agent in an ink. In the ink jet recording medium of the present invention, kaolin that is a white pigment with low transparency and excellent concealing capability is used in the ink receiving layer. For this reason, high image density cannot be realized due to the coloring agent in the ink dyed into an ink receiving layer being concealed by the white pigment with exceptional concealing power when the coloring agent is dissolved in the liquid component, as is called dye ink, is used on the ink jet recording medium of the present invention. When a dye ink is used in the ink jet printing of a recording medium containing an exceptionally effective concealing white pigment, only the coloring agent near the surface layer contributes to the image density regardless of how much the ink application amount is increased. Therefore, the overall image density is low, and the image lacks contrast making it difficult to achieve image qualities nearing those of offset printing.

In contrast, when a so-called pigment ink wherein a coloring agent is dispersed in the liquid component of an ink is applied on the ink jet recording medium of the present invention, adequate image quality can be realized using a small amount of ink since the ink receiving layer functions as the filter that separates the coloring agent from the liquid component in the ink, allows only the liquid component of the ink to selectively penetrate into the receiving layer interior and the support material and efficiently allows the coloring agent in the ink to remain on the surface of the ink receiving layer.

As the fine coloring particles, an aqueous dispersion of fine polymer particles containing a coloring material that is at least either a pigment or a dye is ideally used.

Here, the "containing a coloring material" refers to either a state in which the coloring material is sealed inside the fine polymer particles or a state in which the coloring material is adsorbed on the surface of fine polymer particles or both. In this case, all of the coloring material formulated into the ink of the present invention does not necessarily have to be sealed in or adsorbed on fine polymer particles, and said color material may be dispersed in the emulsion in a range that does not adversely affect the advantages of the present invention. As the color material, no particular restrictions are applied as long as the color material is water insoluble or poorly soluble and is adsorbed by the polymer so that the color material can be appropriately selected according to the objective.

Here the "water insoluble or poorly soluble" description refers to the fact that no more than ten weight parts of the color material dissolves in one hundred weight parts of water at 20° C. In addition, "dissolves" refers to the absence of separated or settled color material that is visually detected in the aqueous solution surface layer or the bottom layer.

The mean volume particle size of the fine polymer particles (fine coloring particles) containing the color material is preferably 0.01 μm to 0.16 μm in the ink.

As the coloring agent, dyes such as oil soluble dyes, dispersed dyes, water soluble dyes and the like, pigments and the like may be cited. The oil soluble dyes and dispersed dyes are preferred from the viewpoint of good adsorption and sealing properties, but pigments are preferably used for the photoresistance of the image obtained.

Now the individual dyes are preferably dissolved in organic solvents such as, for example, in a ketone type solvent at a concentration of at least 2 g/liter from the viewpoint of efficient impregnation of fine polymer particles, and a concentration of 20 g/liter to 600 g/liter is more preferred.

As the water soluble dye, the dyes are classified into acid dyes, direct dyes, basic dyes, reactive dyes and food dyes according to the color index, and those with excellent water resistance and light resistance are preferably used.

As the acidic dyes and food dyes, C.I. acid yellow, 17, 23, 42, 44, 79, 142; C.I. acid red 1, 8, 13, 14, 18, 26, 27, 35, 37, 42, 52, 82, 87, 89, 92, 97, 106, 111, 114, 115, 134, 186, 249, 254, 289; C.I. acid blue 9, 29, 45, 92, 249; C.I. acid black 1, 2, 7, 24, 26, 94; C.I. food yellow 3, 4; C.I. food red 7, 9, 14; C.I. food black 1, 2 and the like, for example, may be cited.

As the direct dyes, C.I. direct yellow 1, 12, 24, 26, 33, 44, 50, 86, 120, 132, 142, 144; C.I. direct red 1, 4, 9, 13, 17, 20, 28, 31, 39, 80, 81, 83, 89, 225, 227; C.I. direct orange 26, 29, 62, 102; C.I. direct blue 1, 2, 6, 15, 22, 25, 71, 76, 79, 86, 87, 90, 98, 163, 165, 199, 202; C.I. direct black 19, 22, 32, 38, 51, 56, 71, 74, 75, 77, 154, 168, 171 and the like, for example, may be cited.

As the basic dyes, C.I. basic yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C.I. basic red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C.I. basic blue 1, 3, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; C.I. basic black 2, 8 and the like, for example, may be cited.

As the reactive dyes, C.I. Reactive Black 3, 4, 7, 11, 12, 17; C.I. Reactive Yellow 1, 5, 11, 13, 14, 20, 21, 22, 25, 40, 47, 51, 55, 65, 67; C.I. Reactive Red 1, 14, 17, 25, 26, 32, 44, 46, 55, 60, 66, 74, 79, 96, 97; C.I. Reactive Blue 1, 2, 7, 14, 15, 23, 32, 35, 38, 41, 63, 80, 95 and the like, for example, may be cited.

As the pigment, no particular restrictions apply and pigments may be appropriately selected according to the objective. For example, either an inorganic or organic pigment may be used.

As the inorganic pigment, titanium oxide, iron oxide, calcium carbonate, barium sulfate, aluminum hydroxide, barium yellow, cadmium red, chrome yellow, carbon black and the like, for example, may be cited. Of these, carbon black and the like are preferred. Now as the carbon black, those produced using well known processes such as a contact process, a furnace process, a thermal process and the like, for example, may be cited.

As the organic pigment, azo pigments, polycyclic pigments, dye chelates, nitro pigments, nitroso pigments, aniline black and the like, for example, may be cited. Of these, azo pigments, polycyclic pigments and the like are more preferred. Now as the azo pigment, azo lakes, insoluble azo pigments, condensed azo pigments, chelated azo pigments and the like, for example, may be cited. As the polycyclic pigment, phthalocyanine pigments, perylene pigment, perynone pigment, anthraquinone pigment, quinacridone pigment, dioxazine pigment, indigo pigment, thioindigo pigment, isoindolinone pigment, quinophthalone pigment and the like, for example, may be cited. As the dye chelate, basic dye type chelates, acidic dye type chelates and the like, for example, may be cited.

The color of the pigment is not particularly restricted and may be appropriately selected according to the objective. For example, pigments for black, pigments for color and the like, for example, may be cited. They may be used individually or in a combination of at least two of them.

As the black pigment, carbon black (C.I. Pigment Black 7) such as furnace black, lamp black, acetylene black, channel black and the like; metals such as copper, iron (C.I. Pigment Black 11), titanium oxide and the like and organic pigments such as aniline black (C.I. Pigment Black 1) and the like, for example, may be cited.

As the pigments for color, for yellow, C.I. Pigment Yellow 1 (Fast Yellow G), 3, 12 (Disazo Yellow AAA), 13, 14, 17, 23, 24, 34, 35, 37, 42 (yellow iron oxide), 53, 55, 74, 81, 83 (Disazo Yellow HR), 95, 97, 98, 100, 101, 104, 108, 109, 110, 117, 120, 128, 138, 150, 153 and the like, for example, may be cited for yellow.

For magenta, C.I. Pigment Red, 1, 2, 3, 5, 17, 22 (Brilliant First Scarlet), 23, 31, 38, 48:2 [Permanent Red 2B (Ba)], 48:2 [Permanent Red 2B (Ca)], 48:3 [Permanent Red 2b(Sr)], 48:4 (Permanent Red 2B (Mn)), 49:1, 52:2, 53:1, 57:1 (Brilliant Carmine 6B), 60:1, 63:2, 64:1, 81 (Rhodamine 6 g Lake), 83, 88, 92, 101 (colcothar), 104, 105, 106, 108 (Cadmium Red), 112, 114, 122 (Dimethyl Quinacridone), 123, 146, 149, 166, 168, 170, 172, 177, 178, 179, 185, 190, 193, 209, 219 and the like, for example, may be cited.

For cyan, C.I. Pigment Blue 1, 2, 15 (Copper Phthalocyanine Blue R), 15:1, 15:2, 15:3 (Phthalocyanine Blue G), 15:4, 15:6 (Phthalocyanine Blue E), 16, 17:1, 56, 60, 63 and the like, for example, may be cited.

In addition, as intermediate colors such as red, green and blue, C.I. Pigment Red 177, 194, 224, C.I. Pigment Orange 43, C.I. Pigment Violet 3, 19, 23, 37, C.I. Pigment Green 7, 36 and the like may be cited.

As the pigment, self dispersing type pigments that form a stable dispersion without using a dispersing agent due to the presence of at least one hydrophilic group directly connected to the pigment surface or bonded through other atomic groupings are ideal for use. As a result, the addition of a dispersion agent to disperse the pigment is made unnecessary. As the self dispersing type pigments, those with ionic characteristics are preferred, and those that are anionically charged or cationically charged are ideal.

The preferred mean volume particle size of the self dispersing type pigments in the ink is 0.01 μm to 0.16 μm.

As the anionic hydrophilic group, —COOM, —SO$_3$M, —PO$_3$HM, —PO$_3$M$_2$, —SO$_2$NH$_2$, —SO$_2$NHCOR (wherein M in the formulae represents a hydrogen atom, alkali metal, ammonium or organic ammonium, R represents an alkyl group containing one to twelve carbon atoms, a phenyl group that may also contain substituents or a naphthyl group that may also contain substituents) and the like, for example, may be cited. Of these, the use of a color pigment in which —COOM or —SO$_3$M is bonded to the pigment surface is preferred.

In addition, as the alkali metal "M" in the hydrophilic group, lithium, sodium, potassium and the like, for example, may be cited. As the organic ammonium, mono, di and trimethyl ammonium, mono, di and triethyl ammonium, mono, di and trimethanol ammonium, for example, may be cited. As the method to obtain the anionically charged color pigment, a method in which a color pigment is treated using sodium hypochlorite to oxidize it, a sulfonation method and a method in which a diazonium salt is allowed to react may be cited as the methods to introduce —COONa to a color pigment surface.

As the cationic hydrophilic group, a quaternary ammonium group, for example, is preferred and pigments containing one of them bonded to the pigment surface are ideal as color materials.

The production method for a cationic self-dispersing type carbon black in which the hydrophilic group is bonded is not particularly restricted and can be appropriately selected according to the objective. For example, a method in which carbon black is treated using 3-amino-N-ethyl pyridium bromide and the like may be cited as the method to bond the N-ethyl pyridyl group represented by the structural formula below.

The hydrophilic group may be bonded to the surface of carbon black through other atomic groupings. As other atomic groupings, alkyl groups containing one to twelve carbon atoms, phenyl groups that may also contain substituents and naphthyl groups that may also contain substituents, for example, may be cited. As specific examples in which the hydrophilic groups mentioned above are bonded to a carbon black surface through other atomic groupings, —$C_2H_4COOM$ (wherein M represents an alkali metal or quaternary ammonium), -$PhSO_3M$ (wherein Ph represents a phenyl group and M represents an alkali metal or quaternary ammonium), —$C_5H_{10}NH_3^+$ and the like, for example, may be cited.

A pigment dispersion obtained using a pigment dispersing agent may be used as the ink used on the ink jet recording medium of the present invention.

As the pigment dispersing agent, the hydrophilic polymeric compounds that are natural materials, for example, plant based polymers such as gum Arabic, tragacanth gum, guar gum, karaya gum, locust bean gum, arabino galactone, pectin, quince seed starch and the like; seaweed based polymers such as alginic acid, carrageenan, agar and the like; animal based polymers such as gelatin, casein, albumin, collagen and the like; microbe based polymers such as xanthan gum, dextran and the like may be cited. As far as semi-synthetic dispersing agents are concerned, fiber based polymers such as methyl cellulose, ethyl cellulose, hydroxyethyl cellulose, hydroxypropyl cellulose, carboxymethyl cellulose and the like; starch based polymers such as starch sodium glycolate, starch sodium phosphate ester and the like; seaweed based polymers such as sodium alginate, alginic acid propylene glycol ester and the like may be cited. As far as purely synthetic dispersing agents are concerned, vinyl type polymers such as poly(vinyl alcohol), poly(vinyl pyrrolidone), poly(vinyl methyl ether) and the like; acrylic resins such as non-crosslinked polyacrylamide, polyacrylic acid or its alkali metal salts, water soluble styrene acrylic resin and the like; water soluble styrene maleic acid resins; water soluble vinylnaphthalene acrylic resins; water soluble vinylnaphthalene maleic acid resins; polyvinyl pyrrolidone, poly (vinyl alcohol); alkali metal salts of β-naphthalene sulfonic acid formalin condensation products; polymeric compounds containing a salt of cationic functional groups such as quaternary ammonium, amino group and the like on the side chain; natural polymeric compounds such as shellac and the like may be cited. Of these, the homopolymers of acrylic acid, methacrylic acid, styrene acrylic acid and copolymers with monomers containing other hydrophilic groups that are polymers to which carboxyl groups had been introduced are particularly preferred as polymeric dispersing agents.

The mean weight molecular weight of the copolymer is preferably from 3000 to 50000, and from 5000 to 30000 is more preferred and from 7000 to 15000 is even more preferred.

A weight ratio of 1:0.06 to 1:3 for the pigment to the dispersing agent (pigment: dispersing agent) is preferred, and 1:0.125 to 1:3 is more preferred.

The preferred amount of the coloring agent in the ink is 6 weight % to 15 weight %, and 8 weight % to 12 weight % is more preferred. When the added amount is less than 6 weight %, the image density could decline due to the declining coloring power, and feathering and blurring could worsen due to the declining viscosity. When the added amount exceeds 15 weight %, the nozzle dries easily when an ink jet recording device is left standing, causing ejection errors, penetration declines due to excessive viscosity increases, and the image density declines or faint images are obtained due to dots not expanding.

(Wetting Agent)

The wetting agent is not particularly restricted and can be appropriately selected according to the objective. For example, at least one agent selected from polyol compounds, lactam compounds, urea compounds and saccharides is ideal.

As the polyol compound, polyvalent alcohols, polyvalent alcohol alkyl ethers, polyvalent alcohol aryl ethers, amides, amines, compounds containing sulfur, propylene carbonate, ethylene carbonate and the like, for example, may be cited. They may be used individually or in combinations of at least two.

As the polyvalent alcohol, ethylene glycol, diethylene glycol, triethylene glycol, polyethylene glycol, polypropylene glycol, 1,3-propane diol, 1,3-butane diol, 1,4-butane diol, 3-methyl-1,3-butane diol, 1,3-propane diol, 1,5-pentane diol, 1,6-hexane diol, glycerol, 1,2,6-hexane triol, 1,2,4-butane triol, 1,2,3-butane triol, petriol(3-Methylpentane-1,3,5-triol) and the like, for example, may be cited.

As the polyvalent alcohol alkyl ether, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether and the like, for example, may be cited.

As the polyvalent alcohol aryl ether, ethylene glycol monophenyl ether, ethylene glycol monobenzyl ether and the like, for example, may be cited.

As the nitrogen containing heterocyclic compound, N-methyl-2-pyrrolidone, N-hydroxyethyl-2-pyrrolidone, 2-pyrrolidone, 1,3-dimethyl imidazolidinone, ε-caprolactam and the like, for example, may be cited.

As the amide, formamide, N-methyl formamide, N,N-dimethyl formamide and the like, for example, may be cited.

As the amine, monoethanolamine, diethanolamine, triethanolamine, monoethylamine, diethylamine, triethylamine and the like, for example, may be cited.

As the sulfur containing compound, dimethyl sulfoxide, sulforan, thiodiethanol and the like, for example, may be cited.

As the lactam compound, at least one compound selected from 2-pyrrolidone, N-methyl-2-pyrrolidone, N-hydrxyethyl-2-pyrrolidone and ε-caprolactam, for example, may be cited.

As the urea compound, at least one compound selected from urea, thiourea, ethylene urea and 1,3-dimethyl-2-imidazolidinone, for example, may be cited. The addition of 0.5 weight % to 50 weight % of the urea to the ink is generally preferred, and 1 weight % to 20 weight % is more preferred.

As the saccharide, monosaccharides, disaccharides, oligosaccharides (includes trisaccharides and tetrasaccharides), polysaccharides and their derivatives may be cited. Of these, glucose, mannose, fructose, ribose, xylose, arabinose, galactose, maltose, cellobiose, lactose, sucrose, trehalose, maltotriose are ideal, and maltitose, sorbitose, gluconolactone and maltose are particularly preferred.

As the polysaccharide, a broad definition of saccharide is used and a compound widely present in the nature, such as α-cyclodextrin, cellulose, may be included.

As derivatives of the saccharide, reduced saccharides of the saccharides [for example, saccharide alcohols (represented by the general formula $HOCH_2(CHOH)_nCH_2OH$ where n represents an integer two to five)], oxidized saccharides (for example, aldonic acid, uronic acid and the like), amino acids, thio acids and the like may be cited. Of these, saccharide alcohols are particularly preferred. As said saccharide alcohols, maltitol, sorbit and the like, for example, may be cited.

Of these, glycerin, ethylene glycol, diethylene glycol, triethylene glycol, propylene glycol, dipropylene glycol, tripropylene glycol, 1,3-butane diol, 2,3-butane diol, 1,4-butane diol, 3-methyl-1,3-butane diol, 1,3-propane diol, 1,5-pentane diol, tetraethylene glycol, 1,6-hexane diol, 2-methyl-2,4-pentane diol, polyethylene glycol, 1,2,4-butane triol, 1,2,6-hexane triol, thiodiglycol, 2-pyrrolidone. N-methyl-2-pyrrolidone and N-hydroxyethyl-2-pyrrolidone are ideal from the standpoints of obtaining excellent effects of solubility and preventing ejection defects caused by moisture evaporation, and glycerin, 3-methyl-1,3-butane diol and 2-pyrrolidone are particularly preferred.

A concentration of the wetting agent in the ink of 10 weight % to 50 weight % is preferred, and from 20 weight % to 35 weight % is more preferred. When the concentration is too low, the nozzle tends to dry easily and defective liquid drop discharge is sometimes observed. When the concentration is too high, the ink viscosity becomes too high and the viscosity could exceed the appropriate range.

(Penetration Agent)

Water soluble organic solvents such as polyol compounds, glycol ether compounds and the like are used as the penetration agent. Using at least one compound selected from polyol compounds containing at least eight carbon atoms and glycol ether compounds is particularly ideal.

When the number of carbon atoms in the polyol compound is less than eight, sufficient penetration is not achieved resulting in recording medium streaking when both sides are printed, and, due to inadequate spreading of the ink on the recording medium, images are not filled well resulting in declining letter quality and image density.

As the polyol compound containing at least eight carbon atoms, 2-ethyl-1,3-hexane diol (solubility: 4.2% at 25° C.), 2,2,4-trimethyl-1,3-pentane diol (solubility: 2.0% at 25° C.) and the like, for example, are ideal.

As the glycol ether compound, a compound can be appropriately selected according to the objective without particular restrictions. For example, polyvalent alcohol alkyl ethers such as ethylene glycol monoethyl ether, ethylene glycol monobutyl ether, diethylene glycol monoethyl ether, diethylene glycol monoethyl ether, diethylene glycol monobutyl ether, tetraethylene glycol monomethyl ether, propylene glycol monoethyl ether and the like; and polyvalent alcohol aryl ethers such as ethylene glycol monophenyl ether, ethylene glycol monobenzyl ether and the like may be cited.

The amount of the penetrating agent is not particularly restricted and can be appropriately selected according to the objective. However, from 0.1 weight % to 20 weight % is preferred, and from 0.5 weight % to 10 weight % is more preferred.

(Surface Activating Agent)

The surface activating agent is not particularly restricted and one can be appropriately selected according to the objective. For example, anionic surfactants, non-ionic surfactants, amphoteric surfactants, fluorinated surfactants and the like may be cited.

As the anionic surfactant, polyoxyethylene alkyl ether acetate salts, dodecylbenzene sulfonic acid salts, lauric acid salts, polyoxyethylene alkyl ether sulfate salts and the like, for example, may be cited.

As the nonionic surfactant, acetylene glycol type surface activating agents, polyoxyethylene alkyl ethers, polyoxyethylene alkyl phenyl ethers, polyoxyethylene alkyl esters, polyoxyethylene sorbitan aliphatic acid esters and the like, for example, may be cited.

As the acetylene glycol type surface activating agent, 2,4,7,9-tetramethyl-5-decene-4,7-diol, 3,6-dimethyl-4-octine-3,6-diol, 3,5-dimethyl-1-hexine-3-ol and the like, for example, may be cited. Said acetylene glycol type surface activating agents are available commercially as, for example, Surfynol 104, 82, 465, 485, TG and the like from Air Products and Chemicals, Inc. (USA).

As the amphoteric surfactant, lauryl aminopropionic acid salts, lauryl dimethyl betaine, stearyl dimethyl betaine, lauryl dihydroxyethyl betaine and the like, for example, may be cited. More specifically lauryl dimethylamine oxide, myristyl dimethylamine oxide, stearyl dimethylamine oxide, dihydroxyethyl laurylamine oxide, polyoxyethylene coconut oil alkyl dimethylamine oxide, dimethylalkyl (coconut) betaine, dimethyllauryl betaine and the like, for example, may be cited.

As the fluorinated surfactant, those agents represented by the general formula (A) below are ideal.

$$CF_3CF_22(CF_2CF_2)_m-CH_2CH_2O(CH_2CH_2O)_nH \qquad (A)$$

However, m represents an integer zero to ten and n represents an integer one to forty in the formula (A).

As the fluorinated surfactant, perfluoroalkyl sulfonic acid compounds, perfluoroalkyl carbone compounds, perfluoroalkyl phosphoric acid ester compounds, perfluoroalkyl ethylene oxide adducts, polyoxyalkylene ether polymer compounds with perfluoroalkyl ether groups on side chains and the like, for example, may be cited. Of these, polyoxyalkylene ether polymer compounds containing perfluoroalkyl ether groups on side chains are particularly preferred due to minimal foaming and excellent safety associated with low fluorine compound biological accumulation recently noted as a concern.

As the perfluoroalkyl sulfonic acid compound, perfluoroalkyl sulfonic acids, perfluoroalkyl sulfonate salts and the like, for example, may be cited.

As the perfluoroalkyl carbone compound, perfluoroalkyl carboxylic acids, perfluoroalkyl carboxylate salts and the like, for example, may be cited.

As the perfluoroalkyl phosphoric acid ester compound, perfluoroalkyl phosphoric acid esters, perfluoroalkyl phosphoric acid ester salts and the like, for example, may be cited.

As the polyoxyalkylene ether polymer compound containing perfluoroalkyl ether groups on side chains, polyoxyalkylene ether polymers with perfluoroalkyl ether groups on side chains, sulfuric acid ester salts of polyoxyalkylene ether polymers with perfluoroalkyl ether groups on side chains, salts of polyoxyalkylene ether polymer with perfluoroalkyl ether groups on side chains and the like, for example, may be cited.

As the ion pair for the salt in these fluorinated surfactants, Li, Na, K, $NH_4$, $NH_3CH_2CH_2OH$, $NH_2(CH_2CH_2OH)_2$, $NH(CH_2CH_2OH)_3$ and the like, for example may be cited.

As the fluorinated surfactant, those that are appropriately synthesized may be used and commercially available products may also be used.

Said commercially available products may be, for example, Surflon S-111, S-112, S-113, S-121, S-131, S-132, S-141, S-145 (all manufactured by AGC Seimi Chemical CO., LTD.), Fluorad FC-93, FC-95, FC-98, FC-129, FC-135, FC-170C, FC-430, FC-431 (all manufactured by Sumitomo 3M Limited.), Megafac F-470, F1405, F-474 (all manufactured by DIC Corporation), Zonyl TBS, FSP, FSA, FSN-100, FSN, FSO-100, FSO, FS-300, UR (all manufactured by Du Pont), FT-110, FT-250, FT-251, FT-400S, FT-150, FT-400SW (all manufactured by NEOS Company LIMITED.), PF-151N (manufactured by Omnova solutions, Inc) and the like. Of these, Zonyl FS-300, FSN, FSN-100, and FSO (Du Pont) are particularly preferred due to good dependability and color development improvement.

(Other Components)

The other components are not particularly restricted and may be appropriately selected according to need. For example, resin emulsions, aminopropane diol compounds, pH adjusting agents, preservative fungicide agents, rust inhibitors, oxidation inhibitors, ultraviolet light absorption agents, oxygen absorption agents, light stabilizing agents and the like may be cited.

(Resin Emulsion)

The resin emulsion may be fine resin particles dispersed in water as the continuous phase and a dispersion agent such as a surfactant may also be used as needed.

A fine resin particle concentration (the concentration of fine resin particles in a resin emulsion) as the dispersion phase component of 10 weight % to 70 weight % is generally preferred. In addition, a particle size of the fine resin particles, in terms of average particle diameter, of 10 nm to 1,000 nm is preferred particularly when the use in an ink jet recording device is taken into consideration, and 20 nm to 300 nm is more preferred.

The fine resin particle component of the dispersion phase is not particularly restricted and can be appropriately selected according to the objective, and acryl type resins, vinyl acetate type resins, styrene type resins, butadiene type resins, styrene-butadiene type resins, vinyl chloride type resins, acrylstyrene type resins, acrylsilicone type resins and the like, for example, may be cited. Of these, acrylsilicone type resins are particularly preferred.

As the resin emulsion, those appropriately synthesized may be used and commercially available products may also be used.

As said commercially available resin emulsion, Microgel E-1002, E-5002 (styrene-acryl type resin emulsions manufactured by Nippon Paint Co., Ltd.), Voncoat 4001 (acryl type resin emulsion manufactured by DIC Corporation), Voncoat 5454 (styrene-acryl type resin emulsion manufactured by DIC Corporation), SAE-1014 (styrene-acryl type resin emulsion manufactured by ZEON CORPORATION), Saibinol SK-200 (acryl type resin emulsion manufactured by SAIDEN CHEMICAL INDUSTRY CO., LTD), Primal AC-22, AC-61 (acryl type resin emulsions manufactured by Rohm and Haas), Nanocryl SBCX-2821, 3689 (acrylsilicone type resin emulsions manufactured by TOY° INK MFG. CO., LTD.), #3070 (methyl methacrylate polymer resin emulsion manufactured by Mikuni Color Ltd.) and the like, for example, may be cited.

As the amount of the fine resin particle component of the resin emulsion added to the ink, 0.1 weight % to 50 weight % is preferred, 0.5 weight % to 20 weight % is more preferred and 1 weight % to 10 weight % is even more preferred. When the amount added is less than 0.1 weight %, plugging resistance and ejection stability are not sufficiently improved. When the amount exceeds 50 weight %, the ink storage stability is sometimes reduced.

The aminopropane diol compound is a basic water soluble organic compound, and aminopropane diol derivatives, for example, are ideal.

The aminopropane diol derivative is not particularly restricted and may be appropriately selected according to the objective. For example, 1-amino-2,3-propane diol, 1-methylamino-2,3-propane diol, 2-amino-2-methyl-1,3-propane diol, 2-amino-2-ethyl-1,3-propane diol and the like may be cited. Of these, 2-amino-2-ethyl-1,3-propane diol is particularly preferred.

An amount of the aminopropane diol compound in the recording ink of 0.01 weight % to 10 weight % is preferred, 0.1 weight 96 to 5.0 weight % is more preferred and 0.1 weight % to 2.0 weight % is even more preferred. When the added amount is too high, risks such as excessively high pH, increased viscosity and the like exists.

As the preservative fungicide agent, 1,2-benzoisothiazolin-3-one, sodium dehydroacetate, sodium sorbitate, sodium 2-pyridine thiol-1-oxide, sodium benzoate, sodium pentachlorophenol and the like, for example, may be cited.

The pH adjusting agent is not particularly restricted as long as the agent can adjust the pH to at least seven without any adverse effect on the ink and may be appropriately selected for the objective.

As said pH adjusting agent, amines such as diethanolamine, triethanolamine and the like; alkali metal element hydroxides such as lithium hydroxide, sodium hydroxide, potassium hydroxide and the like; ammonium hydroxide; quaternary ammonium hydroxides; quaternary phosphonium hydroxides; alkali metal carbonate salts such as lithium carbonate, sodium carbonate, potassium carbonate and the like, for example, may be cited.

As the rust inhibiting agent, acidic sulfite salts, sodium thiosulfate, ammonium thiodiglycolate, di-isopropyl ammonium nitrite, pentaerythritol tetranitrate, and dicyclohexyl ammonium nitrite, for example, may be cited.

As the oxidation inhibitor, phenol type oxidation inhibitors (including hindered phenol type oxidation inhibitors), amine type oxidation inhibitors, sulfur type oxidation inhibitors, phosphorus type oxidation inhibitors and the like, for example, may be cited.

As the phenol type oxidation inhibitors (including hindered phenol type oxidation inhibitors), butylated hydroxyanisole, 2,6-di-tert-butyl-4-ethylphenol, stearyl-β-(3,5-di-tert-butyl-4-hydroxyphenyl) propionate, 2,2'-methylene bis (4-methyl-6-tert-butylphenol), 2,2'-methylene bis(4-ethyl-6-tart-butylphenol), 4,4'-butylidene bis(3-methyl-6-tert-butylphenol), 3,9-bis{1,1-dimethyl-2-[β-(3-tert-butyl-4-hydroxy-5-methylphenyl)propionyloxy]ethyl}2,4,8,10-tetraixa spiro[5,5] undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis[methylene-3-(3',5'-di-tert-butyl-4'-hydroxyphenyl)propionate]methane and the like, for example, may be cited.

As the amine type oxidation inhibitor, phenyl-β-naphthylamine, α-naphthylamine. N,N'-di-sec-butyl-p-phenylene diamine, phenothiazine, N, N'-diphenyl-p-phenylene diamine, 2,6-di-tert-butyl-p-cresol, 2,6-di-tert-butylphenol, 2,4-dimethyl-6-tert-butyl phenol, butyl hydroxyanisole, 2,2'-methylene bis(4-methyl-6-tert-butylphenol), 4,4'-butylidene bis(3-methyl-6-tert-butylphenol), 4,4'-thiobis(3-methyl-6-tert-butylphenol), tetrakis[methylene-3(3,5-di-tert-butyl-4-dihydroxyphenyl)propionate]methane, 1,1,3-tris(2-methyl-4-hydroxy-5-tert-butylphenyl)butane and the like, for example, may be cited.

As the sulfur type oxidation inhibitor, dilauryl 3,3'-thiodipropionate, distearyl thiodipropionate, lauryl stearyl thiodipropionate, dimyristyl 3,3'-thiodipropionate, distearyl β,β'-thiodipropionate, 2-mercaptobenzoimidazole, dilauryl sulfide and the like, for example, may be cited.

As the phosphorus type oxidation inhibitor, triphenyl phosphite, octadecyl phosphite, tri-isodecyl phosphite, trilauryl trithiophosphite, trinonyl phenyl phosphite and the like, for example, may be cited.

As the ultraviolet light absorption agent, benzophenone type ultraviolet light absorption agents, benzotriazole type ultraviolet light absorption agents, salicylate type ultraviolet light absorption agents, cyanoacrylate type ultraviolet light absorption agents, nickel complex salt type ultraviolet light absorption agents and the like, for example, may be cited.

As the benzophenone type ultraviolet light absorption agent, 2-hydroxy-4-n-octoxy benzophenone, 2-hydroxy-4-n-dodecyloxy benzophenone, 2,4-dihydroxy benzophenone, 2-hydroxy-4-methoxy benzophenone, 2,2',4,4'-tetrahydroxy benzophenone and the like, for example, may be cited.

As the benzotriazole type ultraviolet light absorption agent, 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, 2-(2'-hydroxy-3'-tert-butyl-5'-methylphenyl)-5-chlorobenzo triazole and the like, for example, may be cited.

As the salicylate type ultraviolet light absorption agent, phenyl salicylate, p-tert-butylphenyl salicylate, p-octylphenyl salicylate and the like, for example, may be cited.

As the cyanoacrylate type ultraviolet light absorption agent, ethyl-2-cyano-3,3'-diphenyl acrylate, methyl-2-cyano-3-methyl-3-(p-methoxyphenyl)acrylate, butyl-2-cyano-3-methyl-3-(p-methoxyphenyl)acrylate and the like, for example, may be cited.

As the nickel complex salt type ultraviolet light absorption agent, nickel bis(octylphenyl)sulfide, 2,2'-thiobis(4-tert-octylphelate)-n-butylamine nickel (II), 2,2'-thiobis(4-tert-octylphelate)-2-ethylhexylamine nickel (II), 2,2'-thiobis(4-tert-octylphelate)triethanolamine nickel (II) and the like, for example, may be cited.

The ink used on the ink jet recording medium of the present invention is produced by dispersing or dissolving at least water, coloring agents and wetting agents, penetrating agents and surfactants as needed as well as other components as needed in an aqueous medium, and further agitating and mixing when necessary. The dispersion may be conducted using a sand mill, homogenizer, ball mill, paint shaker, ultrasonic dispersing device and the like, for example. The agitation and mixing is ordinarily conducted using an agitator, magnetic stirrer, high speed dispersing device and the like.

A viscosity of the ink of at least 2 mPa·s at 25° C. is preferred when image quality such as letter appearance and the like on non-coated paper are taken into consideration, and 3 mPa·s to 20 mPa·s is more preferred. When the viscosity exceeds 20 mPa·s, ejection stability is difficult to maintain.

A pH of the ink of seven to ten, for example, is preferred.

The color of the ink is not particularly restricted and may be appropriately selected according to the objective, and yellow, magenta, cyan, black and the like may be cited. When an ink set using at least two of the colors is used for the recording, a multiple color image can be generated. And when an ink set using full gamut of colors is used for the recording, a full color image can be generated.

EXAMPLES

The present invention is described below in further details by specific examples, but the present invention is not limited to the examples. In addition, the terms "parts" and "%" described below indicate "weight parts" and "weight %" unless otherwise specified.

Now, the volumetric basis particle size distribution of kaolin was measured using a laser method particle size measurement device (Mastersizer type S manufactured by Malvern Co.). The light source for the red light was 633 nm (He—Ne laser) and for the blue light was 466 nm (LED). The particle size distribution was measured using a sample slurry containing kaolin in pure water. The sample slurry was added dropwise to form a uniform dispersion for use in the measuring device.

(Preparation of Base Paper)

70 weight % of Bleached hardwood kraft pulp (freeness of 480 ml) and 30 weight % of bleached softwood kraft pulp (freeness of 500 ml) were mixed together. To this, 0.5% of cationized starch was added based on the pulp, 0.05% of an alkyl ketene dimer was added based on the pulp, 1% of aluminum sulfate was added based on the pulp and 10% of calcium carbonate was added based on the pulp. The stock was formed into a paper web using a fourdrinier paper machine, and three stages of wet press were used to dry the paper. The web was subsequently subjected to machine calendering to obtain a base paper with a basis weight of 80 g/m².

Example 1

A coating of concentration in terms of solid content of 65% was obtained by mixing one hundred parts of kaolin A (product name Capim DG produced by Rio Capim Co. with particles of at least 0.4 μm to smaller than 4.2 μm account for 71%, particle of particle sizes smaller than 0.4 μm account for 18%, particles of particle sizes at least 4.2 μm account for 11%, as the cumulative value of the volumetric basis), five parts of NB latex A (butadiene concentration 55% and glass transition temperature −41° C.) as the binder, 0.1 parts of sodium hydroxide, 0.2 parts of sodium polyacrylate as the dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. The white paper glossiness according to JIS Z8741 at a light incidence angle of seventy-five degrees was 70%. Calender treatment conditions (treatment nip pressure, temperature, speed and the number of treatment stages) were adjusted to yield a surface roughness of 0.7 μm on the ink receiving layer when a hard backing was used with a clamp pressure of 1,000 kPa according to JIS P8151.

Example 2

A coating of concentration in terms of solid content of 65% was obtained by mixing one hundred parts of above kaolin A, five parts of NB latex B (butadiene concentration 50% and glass transition temperature −40° C.) as the binder, 0.1 parts of sodium hydroxide, 0.2 parts of sodium polyacrylate as the dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 70%, and a surface roughness of 0.7 μm on the ink receiving layer when a hard backing was used with a clamp pressure of 1,000 kPa according to JIS P8151.

Example 3

A coating of concentration in terms of solid content of 65% was obtained by mixing one hundred parts of kaolin B (product name ECLIPS 650 produced by Engelhard Corp. with particles of at least 0.4μm to smaller than 4.2 μm account for 66%, particle of particle sizes smaller than 0.4 μm account for 25%, particles of particle sizes at least 4.2 μm account for 9%, as the cumulative value of the volumetric basis), five parts of NB latex A as the binder, 0.1 parts of sodium hydroxide, 0.2 parts of sodium polyacrylate as the dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 70%, and a surface roughness of 0.7 μm on the ink receiving layer when a hard backing was used with a clamp pressure of 1,000 kPa according to JIS P8151.

Example 4

A coating of concentration in terms of solid content of 65% was obtained by mixing one hundred parts of a kaolin mixture (the particle size distribution of the kaolin mixture was that particles of at least 0.4 μm to smaller than 4.2 μm account for 66%, particle of particle sizes smaller than 0.4 μm account for 19%, particles of particle sizes at least 4.2 μm account for 15%, as the cumulative value of the volumetric basis), containing seventy-five parts of kaolin A and twenty-five parts of kaolin C (product name KCS produced by Imerys Corp. with particles of at least 0.4 μm to smaller than 4.2 μm account for 53%, particle of particle sizes smaller than 0.4 μm account for 21%, particles of particle sizes at least 4.2 μm account for 26%, as the cumulative value of the volumetric basis), five parts of NB latex A as the binder, 0.1 parts of sodium hydroxide, 0.2 parts of sodium polyacrylate as the dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 75%, and a surface roughness of 0.6 μm on the ink receiving layer when a hard backing was used with a clamp pressure of 1,000 kPa according to JIS P8151.

Example 5

A coating of concentration in terms of solid content of 65% was obtained by mixing seventy-five parts of kaolin A, twenty-five parts of ground calcium carbonate (Hydrocarb 90 manufactured by Omya AG), five parts of NB latex A and oxidized starch as the binder, 0.1 parts of sodium hydroxide, 0.2 parts of sodium polyacrylate as the dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 65%, and a surface roughness of 0.7 μm on the ink receiving layer when a hard backing was used with a clamp pressure of 1,000 kPa according to JIS P8151.

Example 6

A coating of concentration in terms of solid content of 65% was obtained by mixing seventy-five parts of kaolin A, twenty-five parts of precipitated calcium carbonate (TP-123 manufactured by OKUTAMA KOGYO CO., LTD.), five parts of NB latex A as the binder, 0.1 parts of sodium hydroxide, 0.2 parts of sodium polyacrylate as the dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 65%, and a surface roughness of 0.7 μm on the ink receiving layer when a hard backing was used with a clamp pressure of 1,000 kPa according to JIS P8151.

Example 7

A coating of concentration in terms of solid content of 65% was obtained by mixing one hundred parts of kaolin A, two parts of NB latex A as the binder, 0.1 parts of sodium hydroxide, 0.2 parts of sodium polyacrylate as the dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 70%, and a surface roughness of 0.7 μm on the ink receiving layer when a hard backing was used with a clamp pressure of 1,000 kPa according to JIS P8151.

Example 8

A coating of concentration in terms of solid content of 65% was obtained by mixing one hundred parts of kaolin A, four parts of NB latex A as the binder, 0.1 parts of sodium hydroxide, 0.2 parts of sodium polyacrylate as the dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 70%, and a surface roughness of 0.7 µm on the ink receiving layer when a hard backing was used with a clamp pressure of 1,000 kPa according to JIS P8151.

Example 9

A coating of concentration in terms of solid content of 65% was obtained by mixing one hundred parts of kaolin A, four parts of NB latex A and one part of oxidized starch (Mermaid 210 manufactured by Shikishima Starch MFG. Co. Ltd.) both as the binder, 0.1 parts of sodium hydroxide, 0.2 parts of sodium polyacrylate as the dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 55%, and a surface roughness of 1.3 µm on the ink receiving layer when a hard backing was used with a clamp pressure of 1,000 kPa according to JIS P8151.

Example 10

A coating of concentration in terms of solid content of 65% was obtained by mixing one hundred parts of kaolin A, eight parts of NB latex A as the binder, 0.1 parts of sodium hydroxide, 0.2 parts of sodium polyacrylate as the dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 70%, and a surface roughness of 0.7 µm on the ink receiving layer when a hard backing was used with a clamp pressure of 1,000 kPa according to JIS P8151.

Example 11

An ink jet recording medium was obtained exactly in the manner described in Example 1 with the exception that the calendering pressure during super calendering was lower than that of Example 1, the white paper gloss according to JIS Z8741 at a light incidence angle of seventy-five degrees was adjusted to 55% and the surface roughness of the ink receiving layer when a hard backing was used with a clamp pressure of 1,000 kPa according to JIS P8151 was adjusted to 1.1 µm.

<Ink Set Preparation>

Ink set A, used in the evaluation involving the evaluation printer 2 described later, was prepared:

Production Example 1

-Preparation of Polymer Solution A-

The interior of a one liter flask equipped with a mechanical agitator, thermometer, nitrogen gas introduction tube, reflux tube and dropping funnel was thoroughly purged with nitrogen gas. Subsequently, 11.2 g of styrene, 2.8 g of acrylic acid, 12.0 g of lauryl methacrylate, 4.0 g of poly(ethylene glycol methacrylate), 4.0 g of styrene macromer (trade name AS-6 manufactured by Toagosei Co., Ltd.) and 0.4 g of mercaptoethanol were mixed, and the mixture was heated to 65° C.

Next, a mixed solution of 100.8 g of styrene, 25.2 g of acrylic acid, 108.0 g of lauryl methacrylate, 36.0 g of poly(ethylene glycol methacrylate), 60.0 g of hydroxyethyl methacrylate, 36.0 g of styrene macromer (trade name AS-6 manufactured by Toagosei Co., Ltd.), 3.6 g of mercaptoethanol, 2.4 g of azo-bis-methyl valeronitrile and 18 g of methyl ethyl ketone was added dropwise to the flask over 2.5 hours. Upon completion of the dropwise addition, a mixed solution of 0.8 g of azo-bis-methyl valeronitrile and 18 g of methyl ethyl ketone was added dropwise to the flask over 0.5 hours. Upon digesting the reaction mixture for an hour at 65° C., 0.8 g of azo-bis-methyl valeronitrile was added and the reaction mixture was digested further for one hour. Upon completion of the reaction, 364 g of methyl ethyl ketone was added to the flask, and 800 g of 50 weight % polymer solution A was prepared.

Production Example 1-1

-Preparation of a Fine Copper Phthalocyanin Pigment Polymer Particle Dispersion- Next, 46 g of the polymer solution A, 33 g of a copper phthalocyanin pigment, 13.6 g of 1 mole/liter aqueous potassium hydroxide solution, 20 g of methyl ethyl ketone and 13.6 g of ion exchanged water were thoroughly agitated, and the mixture was kneaded using a roller mill. The paste obtained was added to two hundred grams of pure water, thoroughly agitated and the methyl ethyl ketone and water were removed by distillation using an evaporator. Glycerin was subsequently added, and a fine copper phthalocyanin pigment polymer particle dispersion, Production Example 1-1, containing 10.9 weight % of the pigment, 7.5 weight % of the resin (solid fraction 18.4 weight %) and 9.1 weight % glycerin was prepared.

Production Example 1-2

-Preparation of a Fine Magenta Pigment Polymer Particle Aqueous Dispersion-

An aqueous dispersion of fine magenta pigment polymer particles, Production Example 1-2, was prepared in the manner described for Production Example 1-1 with the exception that C.I. Pigment Red 122 was used in the place of the copper phthalocyanin pigment in the Production Example 1-1. The aqueous dispersion of the fine magenta pigment polymer particles, Production Example 1-2, contained 13.6 weight % of the pigment, 4.5 weight % of the resin (solid fraction 18.1 weight %) and 9.1 weight % of glycerin.

Production Example 1-3

-Preparation of a Fine Yellow Pigment Polymer Particle Aqueous Dispersion-

An aqueous dispersion of the fine yellow pigment polymer particles of Production Example 1-3 was prepared in the manner described in Production Example 1-1 with the exception that C.I. Pigment Yellow 74 was used in the place of the copper phthalocyanin pigment in Production Example 1-1. The aqueous dispersion of the fine yellow pigment polymer particles of Production Example 1-3 contained 10.9 weight % of the pigment, 7.5 weight % of the resin (solid fraction 18.4 weight %) and 9.1 weight % of glycerin.

Production Example 2

-Preparation of a Surface Treated Black Pigment Dispersion-

Ninety grams of carbon black with a CTAB relative surface area of 150 m$^2$/g and DBP oil absorption rate of 100 ml/100 g was added to 3,000 ml of 2.5N sodium sulfate solution, the mixture was agitated at a rate of 300 rpm at a temperature of 60° C. and the mixture was allowed to react for ten hours to conduct an oxidation treatment. The reaction mixture was filtered, the carbon black separated by filtration was neutralized with a sodium hydroxide solution and ultra filtration was conducted. The carbon black obtained was washed with water and dried. The carbon black obtained was dispersed in pure water so that the pigment concentration was 20 weight % (solid fraction 20 weight %) to prepare a surface treated black pigment dispersion of Production Example 2.

Production Example 3

-Preparation of a Fine Acrylsilicone Particle Dispersion-

The interior of a one liter flask equipped with a mechanical agitator, thermometer, nitrogen gas introduction tube, reflux tube and dropping funnel was thoroughly purged with nitrogen gas. Subsequently, 8.0 g of Latemul S-180 (a reactive emulsifier containing unsaturated carbon atoms manufactured by Kao corporation., 100 weight % component) and 350 g of ion exchanged water were added and mixed. The mixture was heated to 65° C. After heating, 3.0 g oft-butyl peroxybenzoate, a reaction initiator, and 1.0 g of sodium isoascorbic acid were added. Five minutes later, 45 g of methyl methacrylate, 160 g of 2-ethylhexyl methacrylate, 5 g of acrylic acid, 45 g of butyl methacrylate, 30 g of cyclohexyl methacrylate, 15 g of vinyl triethoxy silane, 8.0 g of Latemul S-180 (a reactive emulsifier containing unsaturated carbon atoms manufactured by Kao corporation. 100 weight % component) and 340 g of ion exchanged water were mixed. The mixture was added dropwise over three hours. The reaction mixture was heated for two hours at 80° C. to digest the mixture, subsequently cooled to ambient temperature and the pH was adjusted to seven to eight using sodium hydroxide. Ethanol was removed through distillation using an evaporator, and the water content was adjusted to prepare 730 g of the solution of fine acrylsilicone particle dispersion B with solid fraction 40 weight %, Production Example 3.

Preparation Example

<Ink Set A Preparation>

The individual inks described below were combined to prepare an Ink Set A.

-Cyan Ink A Preparation-

A recording ink was prepared by formulating an ink composition of the formula described below, adjusting the pH and filtering the composition through a membrane filter with an average hole diameter of 5 µm.

<Ink Composition>

Fine polymer particle dispersion containing copper phthalocyanin pigment of Production Example 1-1 [10.9 wt. % pigment, 7.5 wt. % resin (solid fraction 18.4 wt. %), 9.1 wt. % glycerin with the balance water] . . . 43.54 wt. %

Acrylsilicone emulsion of Production Example 3 [solid fraction 40 wt. %, balance water, mean volume particle size 150 nm, glass transition temperature of the resin component −15° C. (differential thermal analysis rise), the inflection point −6° C.] . . . 10 wt. %

Glycerin used as a wetting agent . . . 3.96 wt. %
1,3-Butane diol used as a wetting agent . . . 24.39 wt. %
2-Ethyl-1,3-hexane diol used as a penetrating agent . . . 2 wt. %
Fluorinated surfactant (FS-300, Du Pont, active ingredient 40 wt. %) . . . 2.5 wt. %
Preservative and anti-fungal agent (Proxel LV, Abecia Corp.) . . . 0.05 wt. %
pH adjusting agent (triethanolamine) . . . 0.3 wt. %
Silicone emulsion type defoaming agent (KM-72F, Shin-Etsu Chemical Co., Ltd.) . . . 0.1 wt. %
Water . . . Balance -Magenta Ink A Preparation- A recording ink was prepared by formulating an ink composition of the formula described below, adjusting the pH and filtering the composition through a membrane filter with an average hole diameter of 5 µm.

<Ink Composition>

Fine polymer particle dispersion containing magenta pigment of Production Example 1-2 [13.6 wt. % pigment, 4.5 wt. % resin (solid fraction 18.1 wt. %) . . . 9.1 wt. % glycerin with the balance water] . . . 55.74 wt. %

Acrylsilicone emulsion of Production Example 3 [solid fraction 40 wt. %, balance water, mean volume particle size 150 nm, glass transition temperature of the resin component −15° C. (differential thermal analysis rise), the inflection point −6° C.] . . . 8 wt. %

Glycerin used as a wetting agent . . . 2.42 wt. %
1,3-Butane diol used as a wetting agent . . . 23.25 wt. %
2-Ethyl-1,3-hexane diol used as a penetrating agent . . . 2 wt. %
Fluorinated surfactant (FS-300, DuPont, active ingredient 40 wt. %) . . . 2.5 wt. %
Preservative and anti-fungal agent (Proxel LV, Abecia Corp.) . . . 0.05 wt. %
pH adjusting agent (triethanolamine) . . . 0.3 wt. %
Silicone emulsion type defoaming agent (KM-72F, Shin-Etsu Chemical Co., Ltd.) . . . 0.1 wt. %
Water . . . Balance -Yellow Ink A Preparation- A recording ink was prepared by formulating an ink composition of the formula described below, adjusting the pH and filtering the composition through a membrane filter with an average hole diameter of 5 µm.

<Ink Composition>

Fine polymer particle dispersion containing yellow pigment of Production Example 1-3 [10.9 wt. % pigment, 7.5 wt. % resin (solid fraction 18.4 wt. %), 9.1 wt. % glycerin with the balance water] . . . 43.54 wt. %

Acrylsilicone emulsion of Production Example 3 [solid fraction 40 wt. %, balance water, mean volume particle size 150 nm, glass transition temperature of the resin component −15° C. (differential thermal analysis rise), the inflection point −6° C.] . . . 10 wt. %

Glycerin used as a wetting agent . . . 3.58 wt. %
1,3-Butane diol used as a wetting agent . . . 23.25 wt. %
2-Ethyl-1,3-hexane diol used as a penetrating agent . . . 2 wt. %
Fluorinated surfactant (FS-300, DuPont, active ingredient 40 wt. %). . . 2.5 wt. %

Preservative and anti-fungal agent (Proxel LV, Abecia Corp.)... 0.05 wt. %
pH adjusting agent (triethanolamine)... 0.3 wt. %
Silicone emulsion type defoaming agent (KM-72F, Shin-Etsu Chemical Co., Ltd.)... 0.1 wt. %
Water... Balance -Black Ink A Preparation- A recording ink was prepared by formulating an ink composition of the formula described below, adjusting the pH and filtering the composition through a membrane filter with an average hole diameter of 5 μm.

<Ink Composition>

Carbon black dispersion containing hydrophilic groups of Production Example 2 [solid fraction 20 wt. % with the balance water, coloring agent/resin (weight ratio) in the solid fraction=10/0]... 38.00 wt. %
Acrylsilicone emulsion of Production Example 3 [solid fraction 40 wt. %, balance water, mean volume particle size 150 nm, glass transition temperature of the resin component −15° C. (differential thermal analysis rise), the inflection point −6° C.]... 13.75 wt. %
Glycerin used as a wetting agent... 8.5 wt. %
3-,ethyl-1,3-Butane diol used as a wetting agent... 17.00 wt. %
2-Ethyl-1,3-hexane diol used as a penetrating agent... 2 wt. %
Fluorinated surfactant (FS-300, DuPont, active ingredient 40 wt. %)... 2.5 wt. %
Preservative and anti-fungal agent (Proxel LV, Abecia Corp.)... 0.05 wt. %
pH adjusting agent (triethanolamine)... 0.3 wt. %
Silicone emulsion type defoaming agent (KM-72F, Shin-Etsu Chemical Co., Ltd.)... 0.1 wt. %
Water... Balance The surface tension, pH and viscosity of the individual inks in ink set A were measured as described below, and the results are shown in Table 1.

<pH Measurements>

The pH was measured using a pH meter (Model HM3A manufactured by DKK To a corporation.) at 23° C.

<Viscosity Measurements>

The viscosity was measured using a RE500 type viscosimeter (manufactured by Toki Sangyo Co., Ltd.) with cone 34×R24 at 180 rpm after three minutes at 25° C.

<Surface Tension Measurements>

The surface tension represents a static surface tension measured using a surface tension measuring device (model CBVP-Z manufactured by Kyowa Interface Science Co., Ltd.) and a platinum plate at 25° C.

TABLE 1

| | Ink | Viscosity (mP·s) | Surface tension (mN/m) | pH |
|---|---|---|---|---|
| Ink sets A | Cyan ink A | 8.15 | 25.8 | 9.64 |
| | Magenta ink A | 8.01 | 25.4 | 9.3 |
| | Yellow ink A | 7.84 | 25.3 | 9.76 |
| | Black ink A | 8.08 | 25.5 | 9.39 |

Comparative Example 1

An ink jet recording medium was obtained using exactly the same procedure described in Example 1 with the exception that the calendering pressure during a super calendering treatment was higher than that of Example 1, the white paper gloss measured according to JIS Z8741 using a light incidence angle of seventy-five degrees was adjusted to 85% and the surface roughness of the ink receiving layer measured according to JIS P8151 at a clamp pressure of 1,000 kPa using a backing was adjusted to 0.5 μm.

Comparative Example 2

A coating of concentration in terms of solid content of 65% was obtained by mixing one hundred parts of a kaolin mixture containing fifty parts of kaolin A and fifty parts of kaolin C (the particle size distribution of the kaolin mixture showed that particles of at least 0.4 μm to smaller than 4.2 μm account for 62%, particle of particle sizes smaller than 0.4 μm account for 20%, particles of particle sizes at least 4.2 μm account for 18%, as the cumulative value of the volumetric basis), five parts of NB latex A as a binder, 0.1 parts of sodium hydroxide, 0.2 parts of sodium polyacrylate as a dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 65%, and a surface roughness of 0.7 μm on the ink receiving layer when a hard backing was used with a clamp pressure of 1,000 kPa according to JIS P8151.

Comparative Example 3

A coating of concentration in terms of solid content of 65% was obtained by appropriately mixing fifty parts of kaolin A, fifty parts of ground calcium carbonate (Hydrocarb 90 manufactured by Omya AG), five parts of NB latex A as a binder, 0.1 parts of sodium hydroxide, 0.2 parts of sodium polyacrylate as a dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 60%, and a surface roughness of 0.7 μm on the ink receiving layer when a hard backing was used with a clamp pressure of 1,000 kPa according to JIS P8151.

Comparative Example 4

A coating of concentration in terms of solid content of 65% was obtained by appropriately mixing fifty parts of kaolin A, fifty parts of precipitated calcium carbonate (TP-123 manufactured by OKUTAMA KOGYO CO., LTD.), five parts of NB latex A as a binder, 0.1 parts of sodium hydroxide, 0.2 parts of sodium polyacrylate as a dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 65%, and a surface roughness of 0.7 μm on the ink receiving layer when a hard backing was used with a clamp pressure of 1,000 kPa according to JIS P8151.

Comparative Example 5

A coating of concentration in terms of solid content of 65% was obtained by appropriately mixing one hundred parts of kaolin A, nine parts of NB latex A as a binder, 0.1 parts of sodium hydroxide, 0.2 parts of sodium polyacrylate as a dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 70%, and a surface roughness of 0.7 μm on the ink receiving layer when a hard backing was used with a clamp pressure of 1,000 kPa according to JIS P8151.

Comparative Example 6

A coating of concentration in terms of solid content of 65% was obtained by appropriately mixing one hundred parts of kaolin A, fifteen parts of NB latex A as a binder, 0.1 parts of sodium hydroxide, 0.2 parts of sodium polyacrylate as a dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 70%, and a surface roughness of 0.7 μm on the ink receiving layer when a hard backing was used with a clamp pressure of 1,000 kPa according to JIS P8151.

Comparative Example 7

A coating of concentration in terms of solid content of 65% was obtained by appropriately mixing one hundred parts of kaolin C, five parts of NB latex A as a binder, 0.1 parts of sodium hydroxide, 0.2 parts of sodium polyacrylate as a dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 65%, and a surface roughness of 0.8 μm on the ink receiving layer when a hard backing was used with a clamp pressure of 1,000 kPa according to JIS P8151.

Comparative Example 8

A coating of concentration in terms of solid content of 65% was obtained by appropriately mixing one hundred parts of kaolin D (product name DB PLATE manufactured by Imerys Corp. with particles of at least 0.4 μm to smaller than 4.2 μm account for 49%, particle of particle sizes smaller than 0.4 μm account for 13%, particles of particle sizes at least 4.2 μm account for 38%, as the cumulative value of the volumetric basis), five parts of SB latex A as a binder, 0.1 parts of sodium hydroxide, 0.2 parts of sodium polyacrylate as a dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 65%, and a surface roughness of 0.7 μm on the ink receiving layer when a hard backing was used with a clamp pressure of 1,000 kPa according to JIS P8151.

Comparative Example 9

A coating of concentration in terms of solid content of 65% was obtained by appropriately mixing one hundred parts of kaolin A, five parts of NB latex C (butadiene concentration 40%, glass transition temperature −18° C.) as a binder, 0.1 parts of sodium hydroxide, 0.2 parts of sodium polyacrylate as a dispersion agent and dilution water.

The coating was applied on two sides of a base paper using a blade coater at a coating weight per one surface of 15 g/m². After the coating was applied, the paper was dried to 5% moisture content in the paper and was subjected to a super calendering treatment to obtain an ink jet recording medium. Calender treatment conditions were adjusted to yield the white paper gloss according to JIS Z8741 at a light incidence angle of seventy-five degrees of 65%, and a surface roughness of 0.8 μm on the ink receiving layer when a hard backing was used with a clamp pressure of 1,000 kPa according to JIS P8151.

Comparative Example 10

A coating of concentration in terms of solid content of 15% was obtained by appropriately mixing eighty parts of synthetic amorphous silica (Fine Seal X-60 manufactured by Tokuyama Corp.), twenty parts of synthetic amorphous silica (Fine Seal X-37B manufactured by Tokuyama Corp.), thirty parts of poly(vinyl alcohol) (PVA 117 manufactured by Kuraray) and five parts of ethylene vinyl acetate emulsion as binders, ten parts of a polyamine type dye fixing agent, 0.5 parts of a de-foaming agent (SN Defoamer 480 manufactured by San nopco Limited) and dilution water.

The coating was applied on two sides of a base paper using a blade coater at a coating amount per one surface of 15 g/m². After the coating was applied, the paper was dried to 5% moisture content in the paper and was subjected to a super calendering treatment to obtain an ink jet recording medium with a surface roughness of 2.8 μm.

Comparative Example 11

An ink jet recording medium was obtained in the exact manner described in Example 1 with the exception that the calendering pressure during the super calendering treatment was lowered from that of Example 1, the white paper gloss under a light incident angle of seventy-five degree according to JIS Z8741 was adjusted to 40% and the surface roughness of the ink receiving layer when the clamp pressure according to JIS P8151 with a hard backing was adjusted to 1.8 μm.

<Evaluations>

1-1 White Paper Glossiness

The white paper glossiness (angle of incident light was seventy-five degree) was measured according to JIS Z8741 using a gloss meter (True GLOSS GM-26PRO manufactured by Murakami Color Research Laboratory).

1-2 Surface Roughness (Print-surf Roughness)

The surface roughness of an ink receiving layer when a clamp pressure was 1,000 kPa and a hard backing was used according to JIS P8151 was measured using a surface roughness meter/RAKER PRINT-SURFACE ROUGHNESS TESTER MODEL NO. ME-90 manufactured by MESSMER corp.).

1-3 Air Resistance

The air resistance of an ink jet recording medium was measured according to the Japan Tappi pulp and paper testing method No. 5-2 (Oken method) using a Ohken method air permeance tester (digital type Ohken method air permeance and smoothness tester model EYO-55-1MS manufactured by Asahi Co.).

2. Ink Jet Print Quality

Two commercially available pigment ink jet printers described below were used for printing, and the print was evaluated according to the evaluation method below. Printer 1 used genuine ink (pigment ink) for printing for the evaluation. Printer 2 used the ink set A described above for the evaluation in place of genuine ink.

Printer 1 for the evaluation: PX-G900 manufactured by Seiko Epson Corporation. was used in "plain paper/fine" mode.

Printer 2 for the evaluation: IPSiO GX5000 manufactured by Ricoh Company, Ltd. was used in "glossy paper/high speed" mode.

2-1 Feathering

Printers 1 and 2 described above were used for the evaluation to print parallel straight lines 0.75 points, 1.5 points and 2.25 points width so that the lines were not touching each other but were positioned as close to each other as possible. The ink blurring(feathering) was visually examined and was evaluated according to the standards below.

O: No blurring. Good results.

Δ: Slight blurring. Not extensive enough to cause practical problems.

X: Noticeable blurring. Too extensive for practical applications 2-2 Bleeding

Printers 1 and 2 described above were used for the evaluation to print red and yellow solid squares so that the squares were in contact with each other. The blurring (bleeding) of the bordering sections was visually evaluated according to the standards below.

O: No blurring along the color borderline. Good results.

Δ: Slight blurring along the color borderline. Not extensive enough to cause practical problems.

X: Noticeable blurring along the color borderline. Too extensive for practical applications.

2-3 Uneven Printing of solid image

Printers 1 and 2 described above were used for the evaluation to print solid green squares. Uneven image density was visually evaluated according to the standards below.

⊙: No uneven image density at all. Very good results.

O: Uneven image density was almost non-existent. Good results

Δ: Some uneven image density was observed but presented no practical problems.

X: Uneven image density was noticeable. Not practical for applications.

2-4 Dryness

Printers 1 and 2 described above were used for the evaluation to print straight black lines 0.75 points width. Immediately after printing, the lines were rubbed with a finger and the dryness was evaluated according to the standards below.

O: The printed area practically did not spread when rubbed with a finger. Dried quickly. Good results.

Δ: The printed area spread slightly when rubbed with a finger. The area dried somewhat slowly but did not present practical problems.

X: The printed area spread when rubbed with a finger. The area dried slowly presenting practical problems.

2-5 Rubbing resistance of the printed area

Printer 2 described above was used for the evaluation to print solid red squares. Twenty-four hours after printing, the solidly printed area was rubbed thirty strokes back and forth with a cotton cloth using an abrasion tester II (an abrasion tester model FR-2 manufactured by Suga Test Instruments Co., Ltd.) according to JIS Z0849. The rubbing resistance of the printed area was evaluated according to the standards below.

O: Almost no ink transferred to the cotton cloth. Good results.

Δ: Some ink transferred to the cotton cloth. No practical problems.

X: The ink transferred to the cotton cloth. Not practical for applications.

2-5 Feel of the glossy coated paper for offset printing

Printers 1 and 2 described above were used for the evaluation to ink jet print a designated pattern. An identical pattern was offset printed on a glossy coated paper for off-set printing (Aurora Coat manufactured by Nippon Paper Industries Co., Ltd. Basis weight 104.7 g/m$^2$). The appearance and feel were compared to offset printed materials and were evaluated according to the standards below.

O: The appearance and feel to touch of the medium closely simulate those of coated glossy paper for offset printing. The medium has the feel of offset printed material.

X: The appearance and feel to touch of the medium is different from those of coated glossy paper for offset printing. The medium does not have the feel of offset printed material.

The results obtained are shown in Tables 2 and 3.

TABLE 2

| | Ink receiving Layer | | | | |
| --- | --- | --- | --- | --- | --- |
| | Kaolin | | | | |
| | Cumulative value(%) of the volumetric basis of particles 0.4 μm to 4.2 μm | Cumulative value(%) of the volumetric basis of particles smaller than 0.4 μm | Cumulative value(%) of the volumetric basis of particles larger than 4.2 μm | Parts of kaolin per 100 wt. parts of inorganic pigments | Parts of the binder per 100 wt. parts of inorganic pigments |
| Example 1 | 71 | 18 | 11 | 100 | 5 |
| Example 2 | 71 | 18 | 11 | 100 | 5 |
| Example 3 | 66 | 25 | 9 | 100 | 5 |
| Example 4 | 66 | 19 | 15 | 100 | 5 |
| Example 5 | 71 | 18 | 11 | 75 | 5 |
| Example 6 | 71 | 18 | 11 | 75 | 5 |

TABLE 2-continued

| | | | | | |
|---|---|---|---|---|---|
| Example 7 | 71 | 18 | 11 | 100 | 2 |
| Example 8 | 71 | 18 | 11 | 100 | 4 |
| Example 9 | 71 | 18 | 11 | 100 | 5 |
| Example 10 | 71 | 18 | 11 | 100 | 8 |
| Example 11 | 71 | 18 | 11 | 100 | 5 |
| Comp. Example 1 | 71 | 18 | 11 | 100 | 5 |
| Comp. Example 2 | 62 | 20 | 18 | 100 | 5 |
| Comp. Example 3 | 71 | 18 | 11 | 50 | 5 |
| Comp. Example 4 | 71 | 18 | 11 | 50 | 5 |
| Comp. Example 5 | 71 | 18 | 11 | 100 | 9 |
| Comp. Example 6 | 71 | 18 | 11 | 100 | 15 |
| Comp. Example 7 | 53 | 21 | 26 | 100 | 5 |
| Comp. Example 8 | 49 | 13 | 38 | 100 | 5 |
| Comp. Example 9 | 71 | 18 | 11 | 100 | 5 |
| Comp. Example 10 | — | — | — | — | — |
| Comp. Example 11 | 71 | 18 | 11 | 100 | 5 |

| | Ink receiving Layer | | | | | |
|---|---|---|---|---|---|---|
| | Acrylonitrile butadiene type copolymer (NB) | | | | | |
| | Butadiene content in NB (%) | Acrylonitrile content in NB (%) | Ratio of NB in total binder (%) | Surface roughness (μm) | White paper glossiness (%) | Air resistance (sec) |
| Example 1 | 55 | 34 | 100 | 0.7 | 70 | 1600 |
| Example 2 | 50 | 30 | 100 | 0.7 | 70 | 1600 |
| Example 3 | 55 | 34 | 100 | 0.7 | 70 | 1700 |
| Example 4 | 55 | 34 | 100 | 0.6 | 75 | 1700 |
| Example 5 | 55 | 34 | 100 | 0.7 | 65 | 1600 |
| Example 6 | 55 | 34 | 100 | 0.7 | 65 | 1600 |
| Example 7 | 55 | 34 | 100 | 0.7 | 70 | 1300 |
| Example 8 | 55 | 34 | 100 | 0.7 | 70 | 1500 |
| Example 9 | 55 | 34 | 80 | 1.3 | 55 | 900 |
| Example 10 | 55 | 34 | 100 | 0.7 | 70 | 2100 |
| Example 11 | 55 | 34 | 100 | 1.1 | 55 | 1000 |
| Comp. Example 1 | 55 | 34 | 100 | 0.5 | 85 | 2000 |
| Comp. Example 2 | 55 | 34 | 100 | 0.7 | 65 | 1900 |
| Comp. Example 3 | 55 | 34 | 100 | 0.7 | 60 | 1600 |
| Comp. Example 4 | 55 | 34 | 100 | 0.7 | 65 | 1600 |
| Comp. Example 5 | 55 | 34 | 100 | 0.7 | 70 | 2200 |
| Comp. Example 6 | 55 | 34 | 100 | 0.7 | 70 | 4100 |
| Comp. Example 7 | 55 | 34 | 100 | 0.8 | 65 | 2100 |
| Comp. Example 8 | 55 | 34 | 100 | 0.7 | 65 | 2400 |
| Comp. Example 9 | 40 | 21 | 100 | 0.8 | 65 | 1600 |
| Comp. Example 10 | — | — | — | 2.8 | 4 | 200 |
| Comp. Example 11 | 55 | 34 | 100 | 1.8 | 40 | 800 |

TABLE 3

| | Ink Jet Print Quality Printer 1 for the evaluation | | | | |
|---|---|---|---|---|---|
| | Feathering | Bleeding | Uneven printing of solid image | Drying | Feel of coated glossy paper used in offset printing |
| Example 1 | ○ | ○ | ○ | Δ | ○ |
| Example 2 | ○ | ○ | ○ | Δ | ○ |
| Example 3 | ○ | ○ | ○ | Δ | ○ |
| Example 4 | ○ | ○ | Δ | Δ | ○ |
| Example 5 | ○ | Δ | Δ | Δ | ○ |
| Example 6 | ○ | Δ | Δ | Δ | ○ |
| Example 7 | ○ | ○ | ⊙ | ○ | ○ |
| Example 8 | ○ | ○ | ⊙ | ○ | ○ |
| Example 9 | ○ | ○ | ○ | ○ | ○ |
| Example 10 | ○ | ○ | Δ | Δ | ○ |
| Example 11 | ○ | ○ | ⊙ | ○ | ○ |
| Comp. Example 1 | ○ | Δ | X | Δ | ○ |
| Comp. Example 2 | ○ | Δ | X | Δ | ○ |
| Comp. Example 3 | ○ | X | X | X | ○ |
| Comp. Example 4 | ○ | X | X | X | ○ |
| Comp. Example 5 | ○ | Δ | X | Δ | ○ |
| Comp. Example 6 | ○ | X | X | X | ○ |
| Comp. Example 7 | ○ | Δ | X | Δ | ○ |
| Comp. Example 8 | ○ | Δ | X | Δ | ○ |
| Comp. Example 9 | ○ | ○ | ○ | Δ | ○ |

TABLE 3-continued

| | | | | | | |
|---|---|---|---|---|---|---|
| Comp. Example 10 | ○ | ○ | ⊙ | ○ | | X |
| Comp. Example 11 | ○ | ○ | ⊙ | ○ | | X |

Ink Jet Printing Quality
Printer 2 for the evaluation

| | Feathering | Bleeding | Uneven printing of solid image | Drying | Rubbing resistance of printed area | Feel of coated glossy paper used in offset printing |
|---|---|---|---|---|---|---|
| Example 1 | ○ | ○ | ⊙ | ○ | ○ | ○ |
| Example 2 | ○ | ○ | ⊙ | ○ | Δ | ○ |
| Example 3 | ○ | ○ | ⊙ | ○ | ○ | ○ |
| Example 4 | ○ | ○ | ⊙ | ○ | ○ | ○ |
| Example 5 | ○ | ○ | ○ | ○ | ○ | ○ |
| Example 6 | ○ | ○ | ○ | ○ | ○ | ○ |
| Example 7 | ○ | ○ | ⊙ | ○ | Δ | ○ |
| Example 8 | ○ | ○ | ⊙ | ○ | ○ | ○ |
| Example 9 | ○ | ○ | ⊙ | ○ | Δ | ○ |
| Example 10 | ○ | ○ | Δ | ○ | ○ | ○ |
| Example 11 | ○ | ○ | ⊙ | ○ | ○ | ○ |
| Comp. Example 1 | ○ | ○ | X | Δ | ○ | ○ |
| Comp. Example 2 | ○ | ○ | X | Δ | ○ | ○ |
| Comp. Example 3 | ○ | Δ | X | Δ | ○ | ○ |
| Comp. Example 4 | ○ | Δ | X | Δ | ○ | ○ |
| Comp. Example 5 | ○ | ○ | X | Δ | ○ | ○ |
| Comp. Example 6 | ○ | ○ | X | X | ○ | ○ |
| Comp. Example 7 | ○ | ○ | X | Δ | ○ | ○ |
| Comp. Example 8 | ○ | ○ | X | Δ | ○ | ○ |
| Comp. Example 9 | ○ | ○ | ⊙ | ○ | X | ○ |
| Comp. Example 10 | ○ | ○ | ⊙ | ○ | ○ | X |
| Comp. Example 11 | ○ | ○ | ⊙ | ○ | ○ | X |

The data in Tables 2 and 3 clearly indicated that individual examples delivered images with very little feathering, bleeding and uneven printing in solidly printed areas, excellent drying and rubbing resistance in the printed area and good balance among various print qualities and also yielded the feel of coated glossy paper used in offset printing.

Simultaneously, the solidly printed area was very uneven in Comparative Example 1 in which the surface roughness of the ink receiving layer was lower than 0.6 μm. This may be due to the reduction in the voids and ink absorbance of the ink receiving layer since a calendering treatment was conducted using a strong nip pressure in order to obtain high gloss.

The solidly printed area was very uneven in Comparative examples 2, 7 and 8 in which kaolin with particle size distribution wherein particles from 0.4 μm or more to smaller than 4.2 μm accounts for under 64% as the cumulative value of the volumetric basis is used. And also the solidly printed area was very uneven in Comparative Examples 3 and 4 in which kaolin with particle size distribution wherein particles from 0.4 μm or more to smaller than 4.2 μm accounts for 64% or more, but this kaolin was present in less than sixty weight parts per one hundred weight parts of the inorganic pigment in the ink receiving layer. This may be attributed to the broad particle size distribution in the inorganic pigment as a whole present in the ink receiving layer that reduced the voids in the ink receiving layer due to finely packed inorganic pigment and a decline in absorption properties. When the ratio of ground calcium carbonate or precipitated calcium carbonate used as a pigment in the ink receiving layer was high, it was difficult to raise the white paper gloss. Therefore, a calender treatment under heavy nip pressure was needed to obtain the desired gloss. This appears to have drastically reduced the gaps in the ink receiving layer and lowered ink absorption properties.

In addition, the solidly printed area was very uneven in Comparative Examples 5 and 6 when the acrylonitrile butadiene type copolymer content per inorganic pigment exceeded eight weight parts. This may be attributed to the binder filling the voids in the ink receiving layer and reducing the ink absorption.

In the case of Comparative Example 9 in which an acrylonitrile butadiene type copolymer containing less than 50% of butadiene was used as the binder, the rubbing resistance of the printed area was poor. This may be attributed to the inadequate tackiness caused by the low butadiene concentration in the acrylonitrile butadiene type copolymer resulting in the weaker adhesion of the coloring pigment in the ink.

In the case of Comparative Example 10 in which silica was used as an inorganic pigment and kaolin was totally absent, the printing quality such as ink absorption and the like improved but the feel of a coated glossy paper used in offset printing could not be obtained.

Also in the case of Comparative Example 11 in which the surface roughness of the ink receiving layer was 1.8 μm achieved by changing the conditions used for the super calendering treatment, the printing quality such as ink absorption and the like improved but the feel of a coated glossy paper used in offset printing could not be obtained.

What is claimed is:

1. An ink jet recording medium having an ink receiving layer containing a binder which contains an acrylonitrile butadiene copolymer, the butadiene concentration of the acrylonitrile butadiene copolymer is 50 weight % or more, and an inorganic pigment, wherein the ink receiving layer is on one or two sides of a base paper, wherein the base paper is mainly composed of wood pulp,
  wherein the concentration ratio of the acrylonitrile butadiene copolymer to 100 parts by weight of the inorganic pigment is from one part by weight to eight parts by weight, wherein the inorganic pigment consists of kaolin with particles having a particle size ranging from about 0.4 μm to about 4.2 μm which account for 64% or more as the cumulative value of the volumetric basis when measured using a laser diffraction method, and the surface roughness of the ink receiving layer is from 0.6 μm to 1.4 μm when a hard backing is used at a clamp pressure of 1,000 kPa according to JIS P8151.

2. The ink jet recording medium described in claim 1 wherein the white paper glossiness of the ink receiving layer surface is from 55% to 80% at a light incidence angle of 75 degrees measured according to JIS Z8741.

3. An ink jet recording method using an ink containing at least water, a particulate coloring agent and a wetting agent to record an image on the ink jet recording medium described in claim 1.

4. An ink jet recording method using an ink containing at least water, a particulate coloring agent and a wetting agent to record an image on the ink jet recording medium described in claim 2.

* * * * *

UNITED STATES PATENT AND TRADEMARK OFFICE
CERTIFICATE OF CORRECTION

PATENT NO.       : 8,399,076 B2                                Page 1 of 1
APPLICATION NO.  : 12/740894
DATED            : March 19, 2013
INVENTOR(S)      : Watanabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this
First Day of September, 2015

Michelle K. Lee
*Director of the United States Patent and Trademark Office*